United States Patent

Meisel et al.

(10) Patent No.: US 8,930,192 B1
(45) Date of Patent: Jan. 6, 2015

(54) COMPUTER-BASED GRAPHEME-TO-SPEECH CONVERSION USING A POINTING DEVICE

(75) Inventors: William S. Meisel, Tarzana, CA (US); Mark Anikst, Santa Monica, CA (US)

(73) Assignee: Colvard Learning Systems, LLC, Pacific Palisades, CA (US)

( * ) Notice: Subject to any disclaimer, the term of this patent is extended or adjusted under 35 U.S.C. 154(b) by 384 days.

(21) Appl. No.: 13/191,784

(22) Filed: Jul. 27, 2011

Related U.S. Application Data

(60) Provisional application No. 61/367,961, filed on Jul. 27, 2010, provisional application No. 61/424,918, filed on Dec. 20, 2010.

(51) Int. Cl.
*G10L 13/027* (2013.01)

(52) U.S. Cl.
USPC .......................................................... 704/260

(58) Field of Classification Search
USPC ................ 704/258–268, 270–272, 276
See application file for complete search history.

(56) References Cited

U.S. PATENT DOCUMENTS

| | | | | |
|---|---|---|---|---|
| 5,210,689 A | * | 5/1993 | Baker et al. ..................... | 704/1 |
| 5,832,434 A | * | 11/1998 | Meredith ..................... | 704/260 |
| 6,304,846 B1 | * | 10/2001 | George et al. .................. | 704/270 |
| 7,088,340 B2 | * | 8/2006 | Kato ............................. | 345/168 |
| 2003/0093277 A1 | * | 5/2003 | Bellegarda et al. ........... | 704/260 |
| 2008/0195394 A1 | * | 8/2008 | Francioli ........................ | 704/271 |
| 2008/0319754 A1 | * | 12/2008 | Nishiike et al. ............... | 704/260 |
| 2008/0319755 A1 | * | 12/2008 | Nishiike et al. ............... | 704/267 |
| 2009/0313020 A1 | * | 12/2009 | Koivunen ...................... | 704/260 |
| 2013/0024189 A1 | * | 1/2013 | Kim et al. ...................... | 704/201 |

OTHER PUBLICATIONS

Olive, Joseph P. (1990): "A new algorithm for a concatenative speech synthesis system using an augmented acoustic inventory of speech sounds", In SSW1-1990, 25-30.*

Demol, Mike, et al. "Efficient non-uniform time-scaling of speech with WSOLA." Proceedings of the Speech and Computers (SPECOM) (2005).*

Tihelka, Daniel, and Martin Méner. "Generalized non-uniform time scaling distribution method for natural-sounding speech rate change." Text, Speech and Dialogue. Springer Berlin Heidelberg, 2011.*

* cited by examiner

*Primary Examiner* — Susan McFadden
(74) *Attorney, Agent, or Firm* — Fish & Richardson P.C.

(57) ABSTRACT

Methods, systems and apparatus for a computer based grapheme-to-speech conversion using a pointing device. In one aspect the method of grapheme-to-speech conversion comprises the steps of presenting a plurality of grapheme-labeled regions and touchscreen, receiving an indication that at least one grapheme-labeled region has been touched by a pointing device, producing a phoneme corresponding to the grapheme via an audio speaker, and setting an audible duration of the phoneme corresponding to the amount of time the grapheme has been touched.

23 Claims, 17 Drawing Sheets

LEGEND

Cross-region touch trajectory symbols

⟵⟶ - region width

⟵⟶ - inter-region width

⎯⎯ - time instance delineation

·········· - touch trajectory with sound deferred

- - - - - - - touch trajectory with sound produced

⎯⎯⎯ - sound segment for a phoneme

Region touch events

SOT - start of touch

EOT - end of touch

EOSC - end of starting continuity interval

EOEC - end of ending continuity interval

FIG. 8

COMPUTER-BASED GRAPHEME-TO-SPEECH CONVERSION USING A POINTING DEVICE

CROSS-REFERENCE TO RELATED APPLICATIONS

This application claims the benefit under 35 U.S.C. §119 (e) of U.S. Patent Application No. 61/367,961, entitled "Teaching Reading by Touch," filed Jul. 27, 2010, which is incorporated herein by reference in its entirety. This application also claims the benefit under 35 U.S.C. §119(e) of U.S. Patent Application No. 61/424,918, entitled "Touch-Text-To-Speech; Synchronizing Speech with Finger Movements and On-Screen Objects; and Teaching Reading by Touch," filed Dec. 10, 2010, which is incorporated herein by reference in its entirety.

BACKGROUND

This specification relates to methods, systems, and/or devices, including computer programs encoded on a computer storage medium, for computer-based grapheme-to-speech conversion using a pointing device.

SUMMARY

This specification describes technologies relating to computer-based grapheme-to-speech conversion using a pointing device.

In general, one innovative aspect of the subject matter described in this specification can be embodied in methods that include the actions of: presenting a plurality of grapheme-labeled regions on a computer-based display screen or touchscreen (e.g., each of which corresponds to a phoneme of the language being used), receiving an indication that one or more of the grapheme-labeled regions has been touched by a pointing device, such as a mouse or finger, measuring an amount of time that the pointing device maintains contact with each one of the one or more grapheme-labeled regions that has been touched by the pointing device; producing, at an audio speaker, one or more phonemes, each phoneme corresponding to a grapheme that appears on one of the respective grapheme-labeled regions that has been touched by the pointing device; and setting an audible duration for a particular one of the phonemes produced at the audio speaker based on a measured amount of time that the pointing device maintains contact with a particular one of the grapheme-labeled regions (in some instances, e.g., including space within or between the grapheme-labeled regions) and/or based on the transition speed of the pointing device.

Other embodiments of this aspect include corresponding systems, devices, and computer programs, configured to perform the actions of the methods, encoded on computer storage devices.

These and other embodiments can each optionally include one or more of the following features.

In some implementations, the audible duration associated with the particular one of the phonemes, if the particular one of the phonemes is sustainable, is directly proportional, up to a set maximum duration, to the measured amount of time that the pointing device maintains contact with the particular one of the grapheme-labeled regions.

According to some embodiments, the particular one of the phonemes whose audible duration is set corresponds to a grapheme that appears on the particular one of the grapheme-labeled regions.

Typically, the particular one of the phonemes whose audible duration is set corresponds to a grapheme that appears on another one of the grapheme-labeled regions other than the particular one of the grapheme-labeled regions.

In response to the pointing device touching a grapheme-labeled region that corresponds to a phoneme with a pronunciation that is not sustainable, the method can include introducing a delay before producing the phoneme associated with the touched grapheme-labeled region, if pronunciation of the phoneme corresponding to the grapheme-labeled region cannot be extended; and extending pronunciation of a preceding phoneme, if the pronunciation can be extended.

In response to the pointing device touching a grapheme-labeled region that corresponds to a phoneme with a pronunciation that is not sustainable, the method can include introducing a delay before producing the phoneme associated with the touched grapheme-labeled region, if pronunciation of the phoneme corresponding to the grapheme-labeled region cannot be extended; and initiating pronunciation of a subsequent phoneme without delay.

In some embodiments, producing the one or more phonemes includes producing a sequence of phonemes at the audio speaker in response to the pointing device contacting a sequence of grapheme-labeled regions. Each of the phonemes in the sequence corresponds to one of the graphemes that appears on a respective one of the grapheme-labeled regions and the sequence of phonemes produced at the audio speaker forms a word or a portion of a word corresponding to the sequence of grapheme-labeled regions.

Certain implementations include setting an onset time for one or more of the phonemes based on the measured amount of time.

In some instances, the method includes concatenating the phonemes in the sequence so that the word or the portion of the word produced at the audio speaker is substantially continuous and pronounced to sound like the word or portion of the word without unnatural pauses.

According to one embodiment, the method includes calculating a speed of the pointing device across one or more of the grapheme-labeled regions or one or more portions of the one or more grapheme-labeled regions. Setting the audible duration for the particular one of the phonemes includes setting the audible duration based on the calculated speed. Setting the duration for the particular one of the phonemes produced at the audio speaker can include setting an extended duration based on the calculated speed of the pointing device if the particular one of the phonemes is sustainable.

In some implementations, producing the one or more phonemes includes coarticulating one of the phonemes that corresponds to one of the grapheme-labeled regions based on another phoneme that corresponds to another one of the grapheme-labeled regions touched by the pointing device previously. In some implementations, producing the one or more phonemes includes coarticulating one of the phonemes that corresponds to one of the grapheme-labeled regions based on another phoneme that corresponds to different one of the grapheme-labeled regions touched by the pointing device subsequently. In some implementations, producing the one or more phonemes includes coarticulating one of the phonemes that corresponds to one of the grapheme-labeled regions based on another phoneme or phonemes that correspond to a different one or more of grapheme-labeled regions touched by the pointing device previously and/or subsequently.

In another aspect, a computer system includes a computer-based touchscreen (or computer screen) to present a plurality of grapheme-labeled regions; a timing module to measure an amount of time that a pointing device maintains contact with (or selecting) each of the one or more grapheme-labeled regions; an audio speaker to produce one or more phonemes, each phoneme based on an associated one of the grapheme-labeled regions touched by the pointing device; and a phoneme setting module to set an audible duration for a particular one of the phonemes produced at the audio speaker based on the measured amount of time that the pointing device maintains contact with a particular one of the grapheme-labeled regions.

In some implementations, the audible duration for the particular one of the phonemes produced at the audio speaker is directly proportional to the amount of time measured by the timing module, up to a set maximum duration, if the particular one of the phonemes is sustainable. The particular one of the phonemes whose audible duration is set can correspond to (or be based on) a grapheme that appears on the particular one of the grapheme-labeled regions if the particular one of the phonemes is sustainable. The particular one of the phonemes whose audible duration is set corresponds to (or is based on) a grapheme that appears on one of the grapheme-labeled regions other than the particular one of the grapheme-labeled regions if the particular one of the phonemes is not sustainable.

Typically, the audio speaker produces a sequence of phonemes in response to the pointing device contacting a sequence of the grapheme-labeled regions. Each phoneme in the sequence corresponds to a respective grapheme that appears on one of the grapheme-labeled regions. The sequence of phonemes produced at the audio speaker forms a word or a portion of a word corresponding to the sequence of graphemes.

In certain embodiments, the phoneme setting module sets an onset time for one or more of the phonemes based on the measured amount of time.

Some implementations include a concatenation module to concatenate the phonemes in the sequence so that the word or the portion of the word produced at the audio speaker is substantially continuous and pronounced to sound like the word or the portion of the word without unnatural pauses.

Certain embodiments include a speed calculator to calculate a speed with which the pointing device moves across one or more of the grapheme-labeled regions or one or more portions of the one or more grapheme-labeled regions. In those embodiments, the audible duration of one or more of the phonemes produced at the audio speaker in response to the one or more grapheme-labeled regions being touched can be related to the calculated speed. The phoneme duration setting module sets an extended duration for a particular one of the one or more phonemes can be based on the calculated speed of the pointing device if the particular one of the phonemes is sustainable. The particular one of the phonemes whose audible duration is set can corresponds to or be based upon a grapheme that appears on one of the grapheme-labeled regions other than the particular one of the grapheme-labeled regions if the particular one of the phonemes is not sustainable.

In some implementations, the computer system includes a coarticulation module to coarticulate one of the phonemes that corresponds to one of the grapheme-labeled regions based on another phoneme that corresponds to another one of the grapheme-labeled regions touched by the pointing device previously. In some implementations, the computer system includes a coarticulation module to coarticulate one of the phonemes that corresponds to one of the grapheme-labeled regions based on another phoneme that corresponds to a different one of the grapheme-labeled regions touched by the pointing device subsequently. In some implementations, the computer system includes a coarticulation module to coarticulate one of the phonemes that corresponds to one of the grapheme-labeled regions based on other phonemes that correspond to different grapheme-labeled regions touched by the pointing device previously and subsequently.

In yet another aspect, a non-transitory computer-readable medium stores instructions executable by one or more processors to perform a method including: presenting a plurality of grapheme-labeled regions on a computer-based touchscreen; receiving an indication that one or more of the grapheme-labeled regions has been touched by a pointing device; measuring an amount of time that the pointing device maintains contact with each one of the one or more grapheme-labeled regions that has been touched by the pointing device; and producing, at an audio speaker, one or more phonemes, each phoneme based on a grapheme that appears on one of the respective grapheme-labeled regions that has been touched by the pointing device; and setting an audible duration for a particular one of the phonemes produced at the audio speaker based on a measured amount of time that the pointing device maintains contact with a particular one of the grapheme-labeled regions.

In yet another aspect, a computer-based method includes presenting a plurality of grapheme-labeled regions on a computer-based touchscreen; receiving an indication that one or more of the grapheme-labeled regions has been touched by a pointing device moving across the touchscreen; and producing, at an audio speaker, one or more phonemes that correspond to the one or more grapheme-labeled regions. A particular one of the phonemes produced at the audio speaker is coarticulated based on at least one other phoneme produced at the audio speaker either immediately before or immediately after the particular one of the phonemes.

In some implementations, the particular one of the phonemes is coarticulated based on the phoneme produced at the audio speaker immediately before the particular one of the phonemes. In some implementations, the particular one of the phonemes is coarticulated based on the phoneme produced at the audio speaker immediately after the particular one of the phonemes.

In a typical embodiment, the computer-based method includes: storing multiple versions of the particular one of the phonemes in a computer-based memory storage device; and selecting one of the versions based on at least one of the other phonemes either immediately before or immediately after the particular one of the phonemes.

The grapheme-labeled regions can be arranged on the touchscreen in virtually any manner, for example, so that when they are sequentially touched by the pointing device, the corresponding phonemes that are produced at the audio speaker form a word or a word portion.

The computer-based, in some embodiments, includes measuring an amount of time that the pointing device maintains contact with each one of the one or more grapheme-labeled regions that has been touched by the pointing device; and setting an audible duration for a certain one of the phonemes produced at the audio speaker based (e.g., either directly or indirectly) on the measured amount of time that the pointing device maintains contact with one of the grapheme-labeled regions.

In yet another aspect, a computer system includes a computer-based touchscreen to present a plurality of grapheme-labeled regions; an audio speaker to produce one or more phonemes that correspond to one or more of the grapheme-labeled regions touched by a pointing device; and a coarticulation module to determine an appropriate coarticulation of one or more of the phonemes produced at the audio speaker based on at least one of the other phonemes produced at the audio speaker either immediately before or immediately after the particular one of the phonemes.

The particular one of the phonemes can be coarticulated based on the phoneme produced at the audio speaker immediately before the particular one of the phonemes. The particular one of the phonemes can be coarticulated based on the phoneme produced at the audio speaker immediately after the particular one of the phonemes.

In some implementations, the computer system includes a memory storage device to store multiple versions of the one or more phonemes. Each version can be coarticulated differently. The system further includes a phoneme selection module to select an appropriately coarticulated one of the versions based, at least in part, on at least one of the other phonemes produced at the audio speaker either immediately before or immediately after the particular one of the phonemes.

The grapheme-labeled regions can, in certain instances, be arranged so that when they are sequentially touched by the pointing device, the corresponding phonemes that are produced at the audio speaker form a word or a word portion.

In certain embodiments, the computer system includes a timer to measure an amount of time that the pointing device maintains contact with each one of the one or more grapheme-labeled regions that has been touched by the pointing device; and a phoneme timing module to set an audible duration for a certain one of the phonemes produced at the audio speaker based on the measured amount of time that the pointing device maintains contact with one of the grapheme-labeled regions.

In still another aspect, a computer storage medium encoded with a computer program, the program comprising instructions that when executed by data processing apparatus cause the data processing apparatus to perform operations comprising: presenting a plurality of grapheme-labeled regions on a computer-based touchscreen; receiving an indication that one or more of the grapheme-labeled regions has been touched by a pointing device moving across the touchscreen; and producing, at an audio speaker, one or more phonemes that correspond to the one or more grapheme-labeled regions. A particular one of the phonemes is coarticulated based on at least one of the other phonemes produced at the audio speaker either immediately before or immediately after the particular one of the phonemes.

In yet another aspect, a computer-based method includes presenting a plurality of grapheme-labeled regions on a computer-based touchscreen, where each region is labeled with a letter or combination of letters; receiving an indication that a particular one of the grapheme-labeled regions has been touched by a pointing device moving across the touchscreen; and predicting which of the other grapheme-labeled regions on the computer-based touchscreen will be touched next by the pointing device.

In some implementations, the computer-based method includes: storing in an electronic database multiple database entries that respectively represent different pronunciations of the letter or combinations of letters on the particular one of the grapheme-labeled regions touched by the pointing device.

In a typical embodiment, the computer-based method includes: selecting among the multiple database entries one of the different ways to pronounce the letter or combination of letters of the grapheme-labeled region that has been touched based on the prediction as to which of the other grapheme-labeled regions on the computer-based touchscreen will be touched next; and producing, at an audio speaker, a pronunciation of the letter or combination of letters on the grapheme-labeled region that has been touched based on the selected database entry.

According to certain implementations, the audio speaker is adapted so that it begins producing the pronunciation of the letter or combination of letters associated with the grapheme-labeled region that has been touched before the pointing device touches the next one of the grapheme-labeled regions.

The grapheme-labeled regions can be arranged on the touchscreen in two or more columns in such a manner that one of the grapheme-labeled regions from each column can be touched by the pointing device in a sequence that causes the audio speaker to produce a word or a word portion without lifting up the pointing device so that the pointing device remains in contact with the touchscreen.

Each of the plurality of grapheme-labeled regions can have a plurality of discrete physical sectors associated with it. Predicting which of the other grapheme-labeled regions on the computer-based touchscreen will be touched next can include monitoring which of the physical sectors associated with the touched labeled region is in contact with the pointing device. Predicting which of the other grapheme-labeled regions on the computer-based touchscreen will be touched next by the pointing device can include identifying a particular one of the grapheme-labeled regions that is physically proximate the physical sector that is in contact with the pointing device as the predicted next grapheme-labeled region to be touched by the pointing device. Predicting which of the other grapheme-labeled regions on the computer-based touchscreen will be touched next by the pointing device can include confirming that the predicted next grapheme-labeled region to be touched is correct in response to the pointing device touching one of the physical sectors associated with the predicted next grapheme-labeled region. In some implementations, the pronunciation of the letter or combination of letters is produced after confirming that the predicted next grapheme-labeled region to be touched is correct.

According to some embodiments, predicting which of the other grapheme-labeled regions on the computer-based touchscreen will be touched next by the pointing device includes: identifying a plurality of fields that extend from the grapheme-labeled region being touched by the pointing device to one or more of the other grapheme-labeled regions that could be touched by the pointing device next; and identifying which, if any, of the plurality of fields the pointing device is touching after the pointing device moves outside of the touched grapheme-labeled region; and designating the grapheme-labeled region associated with the identified field as the predicted next grapheme-labeled region to be touched by the pointing device.

In certain implementations, the computer-based method further includes: calculating a probability that the predicted next grapheme-labeled region to be touched by the pointing device is correct.

In some embodiments, a pair of adjacent grapheme-labeled regions on the touchscreen corresponds to letters or combinations of letters that would not change the pronunciation of a previously articulated letter or combination of letters. In such instances, identifying the plurality of fields can include identifying a single field that extends from one of the grapheme-labeled regions to the pair of adjacent grapheme-labeled regions.

The plurality of grapheme-labeled regions on the touchscreen can be arranged to facilitate predicting the next grapheme-labeled region to be touched by the pointing device. In some embodiments, at least some of the letters or combinations of letters on the plurality of grapheme-labeled regions may be pronounced differently to produce a word or word portion depending on which of the other grapheme-labeled regions was touched by the pointing device previously.

Producing, at the audio speaker, the pronunciation of the letter or letters that corresponds to the particular one of the grapheme-labeled regions, can include pronouncing the letter or letters based on the previously-touched grapheme-labeled region.

In another aspect, a computer system includes a computer-based touchscreen to present a plurality of grapheme-labeled regions on a computer-based touchscreen, wherein each region is labeled with a letter or combination of letters; a prediction module to predict, in response to an indication that a particular one of the grapheme-labeled regions has been touched by a pointing device on the touchscreen, which of the other grapheme-labeled regions on the computer-based touchscreen will be touched next by the pointing device; an electronic database to store multiple database entries that respectively represent different pronunciations of the letter or combinations of letters on the particular one of the grapheme-labeled regions touched by the pointing device; and an audio speaker to pronounce the letter or combination of letters according to a selected one of the multiple database entries that correspond to the letter or combination of letters on the particular one of the grapheme-labeled regions that has been touched by a pointing device.

In some implementations, the computer system includes a selection module to select among the multiple database entries one of the different ways to pronounce the letter or combination of letters of the grapheme-labeled region that has been touched based the prediction as to which of the other grapheme-labeled regions on the computer-based touchscreen will be touched next.

The audio speaker can begin pronouncing the letter or combination of letters associated with the grapheme-labeled region that has been touched before the pointing device touches the next one of the grapheme-labeled regions.

The grapheme-labeled regions can be arranged on the touchscreen in two or more columns in such a manner that one of the grapheme-labeled regions from each column can be touched by the pointing device in a sequence that causes the audio speaker to produce a word or a word portion.

Each of the plurality of grapheme-labeled regions can be divided up into a plurality of discrete physical sectors. In such instances, the prediction module can predict which of the other grapheme-labeled regions on the computer-based touchscreen will be touched next by the pointing device by monitoring which of the physical sectors associated with the touched grapheme-labeled region is in contact with the pointing device. Moreover, in some implementations, the prediction module can predict which of the other grapheme-labeled regions on the computer-based touchscreen will be touched next by the pointing device by identifying a particular one of the grapheme-labeled regions that is physically proximate the physical sector that is in contact with the pointing device as the predicted next grapheme-labeled region to be touched by the pointing device. Moreover, in some implementations, the prediction module can confirm that the predicted next grapheme-labeled region to be touched is correct in response to the pointing device touching one of the physical sectors associated with the predicted next grapheme-labeled region.

The audio speaker, in some instances, can produce the pronunciation of the letter or combination of letters after the prediction module confirms that the predicted next grapheme-labeled region to be touched is correct.

In some implementations, the prediction module predicts which of the other grapheme-labeled regions on the computer-based touchscreen will be touched next by the pointing device by: identifying a plurality of fields that extend from the grapheme-labeled region being touched by the pointing device to one or more of the other grapheme-labeled regions that could be touched by the pointing device next; identifying which, if any, of the plurality of fields the pointing device is touching after the pointing device moves outside of the touched grapheme-labeled region; and designating the grapheme-grapheme-labeled region associated with the identified field as the predicted next grapheme-labeled region to be touched by the pointing device.

Certain embodiments include a probability calculator to calculate a probability that the predicted next grapheme-labeled region to be touched by the pointing device is correct.

According to some implementations, a pair of adjacent grapheme-labeled regions on the touchscreen correspond to letters or combinations of letters that would not change the pronunciation of a previously (or subsequently) pronounced letter or combination of letters, and identifying the plurality of fields includes identifying a single field that extends from one of the grapheme-labeled regions to the pair of adjacent grapheme-labeled regions.

The plurality of grapheme-labeled regions on the touchscreen can be arranged to facilitate predicting the next grapheme-labeled region to be touched by the pointing device.

In a typical implementation, at least some of the letters or combinations of letters on the plurality of grapheme-labeled regions may be pronounced differently to produce a word or word portion depending on which of the other grapheme-labeled regions was touched by the pointing device previously.

The audio speaker typically pronounces the letter or letters that corresponds to the particular one of the grapheme-labeled regions based on the previously-touched grapheme-labeled region.

In yet another aspect, a computer storage medium encoded with a computer program, the program comprising instructions that when executed by data processing apparatus cause the data processing apparatus to perform operations including: presenting a plurality of regions on a computer-based touchscreen, wherein each region is grapheme-labeled with a letter or combination of letters; receiving an indication that a particular one of the grapheme-labeled regions has been touched by a pointing device moving across the touchscreen; and predicting which of the other grapheme-labeled regions on the computer-based touchscreen will be touched next by the pointing device.

In general, another aspect of the subject matter described in this specification can be embodied in methods that include the actions of: presenting a plurality of grapheme-labeled regions on a computer-based touchscreen (each of which corresponds to a phoneme of the language being used); receiving an indication that one or more of the grapheme-labeled regions has been touched by a pointing device moving across the touchscreen; and producing, at an audio speaker, one or more phonemes that correspond to the one or more grapheme-labeled regions, wherein a particular one of the phonemes is coarticulated based on at least one of the other phonemes produced at the audio speaker either immediately before or immediately after the particular one of the phonemes.

In general, another aspect of the subject matter described in this specification can be embodied in methods that include the actions of: presenting a plurality of grapheme-labeled regions on a computer-based touchscreen (each of which corresponds to a phoneme of the language being used); receiving an indication that one or more of the grapheme-labeled regions has been touched by a pointing device moving across the touchscreen; and producing, at an audio speaker, one or more phonemes that correspond to the one or more grapheme-labeled regions, wherein the series of phonemes or coarticulated phonemes is spoken continuously in the manner of natural speech.

Other embodiments of this aspect include corresponding systems, devices, and computer programs, configured to perform the actions of the methods, encoded on computer storage devices.

In general, another aspect of the subject matter described in this specification can be embodied in methods that include the actions of: presenting a plurality of regions on a computer-based touchscreen, wherein each region is labeled with a letter or combination of letters; receiving an indication that a particular one of the labeled regions has been touched by a pointing device moving across the touchscreen; and predicting which of the other labeled regions on the computer-based touchscreen will be touched next by the pointing device.

Other embodiments of this aspect include corresponding systems, devices, and computer programs, configured to perform the actions of the methods, encoded on computer storage devices.

Particular embodiments of the subject matter described in this specification can be implemented so as to realize one or more of the following advantages.

For example, in certain implementations, such as those that related to early reading education, a key point that is made is that speech is composed of a series of sounds (phonemes), that those sounds are fairly small in number, and are expressed in "text" form as symbols (letters and letter combinations in English). The relationship can be quite complex and irregular, particularly in English, making the teaching of reading, writing, and spelling a challenge. Research has shown that teaching "whole-word" reading that teaches full words rather than their phonetic composition (often called "phonics") is far inferior to teaching the phonetic approach that lets a child read words they haven't memorized. The disclosure herein makes the connection between sounds and written letters more intuitive by allowing a learner to hear a sound as they touch a symbol (e.g., letter or letters that appear on a grapheme-labeled region), and, importantly, to hear how those sounds combine as a finger is run over the letters, with the sounds being coordinated with (i.e., related to) the speed of movement of the finger. The situation where a finger pauses on a letter that is not the end of a word can be handled, particularly where such pauses can be a problem (e.g., if the phonemes can't be sustained, such as plosives (e.g., "p," "t")). Additionally, in some implementations, the system correctly pronounces graphemes whose pronunciation depends on context, sometimes based on letters that follow or precede the grapheme being touched. Further, the methodology supports continuous pronunciation, so that the word sounds natural, even if "stretched out," rather than a series of phonemes with pauses in between.

Understanding the connection between sound and letter is key to a child's learning to read and the methodology of grapheme regions and touching allows a child to "play" by touching individual grapheme regions and hearing the associated sound. The methodology described also supports reading education research in that it allows the concept that the sounds, not the letters, are key. The methodology of "this letter sounds like this," even though a phonics approach is confusing, particularly in languages like English where a phoneme is written many ways. (For example, the "e" sound is spelled "ea" in "read" and "ee" in "feed" and is not pronounced the same way in "fed" or "the.") The predictive method of pronunciation described herein can emphasize the dependence of pronunciation of letters on context by showing more than one word on the screen and having the pronunciation depend on which grapheme regions the child touches. This same advantage applies if a person who otherwise cannot speak is using the technology to speak words by stroking the letters on a screen; the sound of a letter touched may depend on the next letter touched.

The terms "left," "right," "front," "back," "up," "down," "top," "bottom," "over," "under," "above," "below," "horizontal," "vertical" and the like in the description and the claims, if any, are used for descriptive purposes and not necessarily for describing permanent relative positions. It is to be understood that the terms so used are interchangeable under appropriate circumstances such that embodiments of the invention described herein are, for example, capable of operation in other orientations than those illustrated or otherwise described herein.

The terms "real time," "substantially real time" and the like are used to reflect action that need not be instantaneous. Typically, these terms refer to an action without any intentional delay, taking into account, for example, processing limitations of the device/system performing the action.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 8 is a legend of symbols used in FIGS. 9-11.

Like reference numbers and designations in the various drawings indicate like elements.

DETAILED DESCRIPTION

Figure 1:
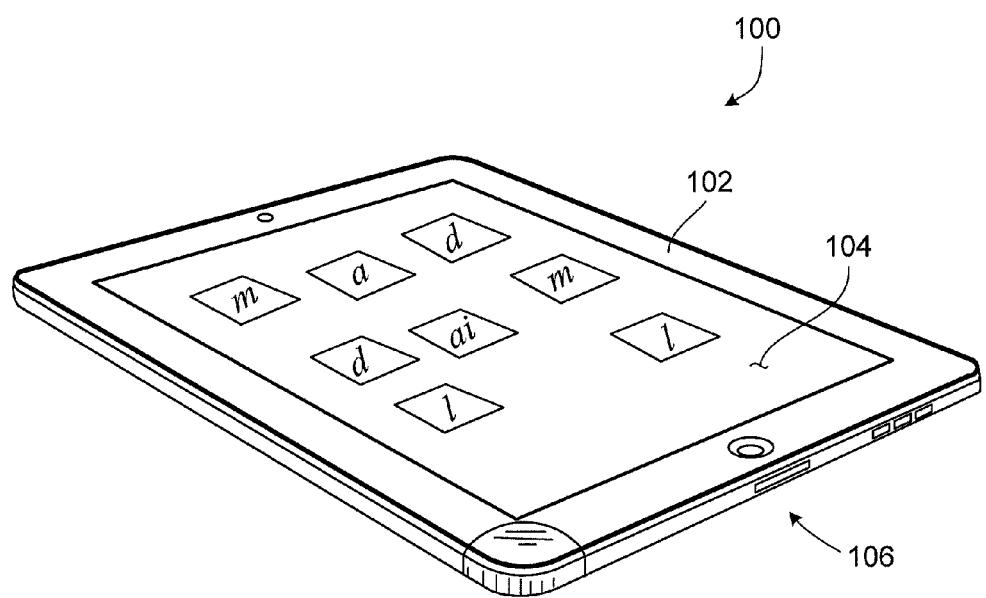
FIG. 1 is perspective view of a computer device.

FIG. 1 shows a tablet-style computer device 100 that provides one example of a platform for implementing one or more of the computer-based methods disclosed herein. The computer device 100 includes a housing 102, a touchscreen 104 and one or more audio speakers 106.

The illustrated touchscreen 104 is adapted to present a plurality of labeled regions, each of which can be labeled with a letter or a combination of letters (e.g., a grapheme). These grapheme-labeled regions are distributed about the touchscreen 104 and, in the illustrated implementation, are arranged in three columns. The computer device 100 is adapted such that, in response to a user moving his or her finger across the touchscreen, contacting one or more of the grapheme-labeled region, it produces one or more sounds (e.g., phonemes or phonemes modified by the context of preceding or following phonemes) at the audio speaker 106. The sounds (or phonemes) correspond to the touched grapheme-labeled regions respectively within the context of a word being traced or presented.

In a typical implementation, if the user moves his or her finger across the touchscreen to touch a sequence of the grapheme-labeled regions in a way that forms a word (e.g., "m," "ai," "l", which forms "mail"), then the computer device 100 reacts by producing the word "mail" at the audio speaker 106. As discussed in detail herein, in various implementations the computer device 100 can perform these functions: (1) such that the speed of articulation for each phoneme in "mail" is related to the speed that the user's finger moved across each of the corresponding grapheme-labeled regions on the touchscreen; (2) appropriately coarticulating each phoneme in view of preceding and subsequent phonemes; and/or (3) pronouncing each phoneme correctly and in a natural-sounding manner very quickly in response to a particular grapheme-labeled region being touched. Some implementations may include only one of these aspects, whereas other implementations may include any two or more (e.g., all three) of these aspects in combination. Other implementations are possible as well.

The concepts disclosed herein have a wide range of potential uses including, for example, teaching a person (e.g., a child) how to read. They could also be used as assistive technology for persons with speaking impairments. In particular, the concepts disclosed can be implemented as a speech production tool that produces accurate-sounding pronunciations in a timely, intuitive manner coordinated with user-initiated movement on a graphical display.

The illustrated touchscreen 104 is an electronic visual display that is integrated into the housing 102 and can detect the presence and location of a touch within the display area. The touch may be from a user's finger or hand, but also may be from other passive objects, such as a stylus or the like. In general, the touchscreen 104 enables a user to interact directly with what is being displayed, rather than indirectly with a pointer controlled by a mouse or a touchpad. It also lets one do so without requiring any intermediate device (e.g., a stylus) that would need to be held in the hand. The method described could be used on a conventional display screen with any pointing mechanism, including a mouse, but a touchscreen is a preferred embodiment.

The audio speaker 106 is integrated into the housing 102. The audio speaker 106 is an electroacoustic transducer that produces sound in response to an electrical audio signal.

In a typical implementation, the computer device 100 can be connected to the Internet. It is also can be operable to run one or more software applications, also known as applications or, simply, "apps." An app is a computer software program designed to provide some type of functionality to the computer device. Apps can come pre-loaded on a computer device or can be downloaded, for example, from the Internet.

In some embodiments, one or more of the aspects disclosed herein may be implemented by virtue of the computer device 100 executing an app.

In some implementations, the computer device 100 is an iPad® portable computing device, available from Apple®, Inc, which is headquartered in Cupertino, Calif.

In a typical implementation, each region is labeled with a grapheme. Examples of graphemes include one or more alphabetical letters and numeric digits and individual symbols of any of the world's writing systems. A phoneme is the smallest segmental unit of sound employed to form meaningful contrasts between utterances in a language. Thus a phoneme is a sound or a group of different sounds which is/are all perceived to have the same function by speakers of the language or dialect in question.

In the English language, grapheme can have one or two or more letters and generally represents a single phoneme. For example, the word "ship" contains four letters (s, h, i, and p) but only three graphemes (sh, i, and p) representing three phoneme sounds (/sh/,/i/,/p/). Furthermore, a grapheme can represent different phonemes on different occasions, and vice versa. For instance, in English, the sound /f/ can be represented by "f," "ff," "ph," or "gh."

In some instances, the same phoneme can produce different sounds depending on what, if any, phonemes come before or after it. An example is the phoneme /k/ in the words kit and skill. In particular, the k sounds in each of these words is actually pronounced differently: they are different speech sounds, or phones. In this example, the /k/ in kit is aspirated, $[k^h]$, while the /k/ in skill is not. Even sounds that we perceive as the same, e.g., the "a" in "ran" and the "a" in "pat" are actually different at the acoustic level, since they are spoken continuously and the position of the vocal apparatus from both the previous and following sound affect the actual vocal pronunciation of the beginning and end of the "a" sound. In effect, we move our vocal apparatus toward an intended "target" for the sound. This effect is called coarticulation. It results from the fact that our physical speaking mechanism moves continuously and is not a digital recording. If individual sounds of phonemes are concatenated without taking coarticulation into account, a word may sound less natural. Variations in phonemes caused by coarticulation are sometimes called "allophones."

The exemplary touchscreen 104 of FIG. 1 includes nine grapheme-labeled regions 108, six of which are labeled with single letters (i.e., "m," "d," "l," "a," "d," "m" and "l") and one of which is labeled with two letters (i.e., "ai"). In a simple case, only one word is displayed, in which case the grapheme-labeled region will be aligned in one row, with the word spelled left-to-right (in English).

Figure 2:
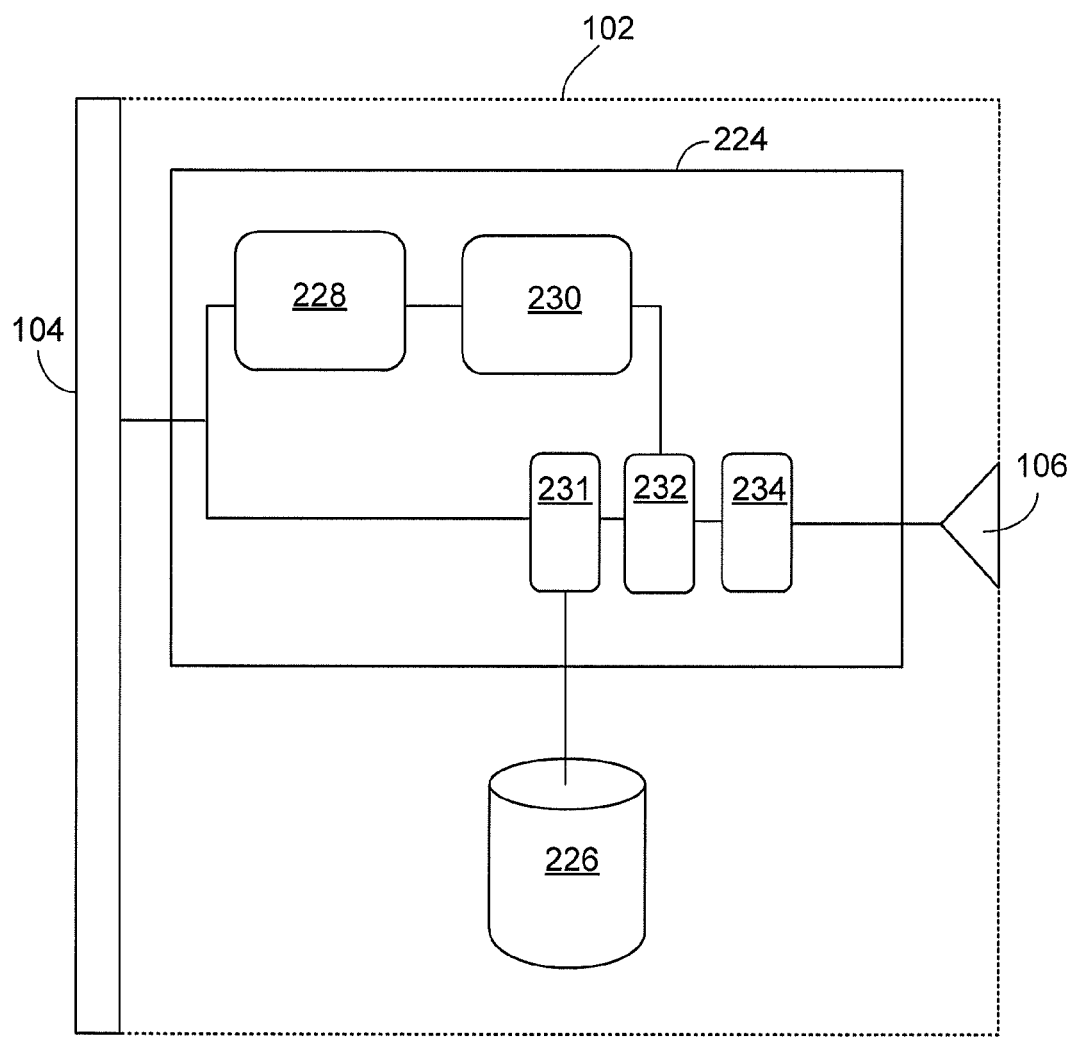
FIG. 2 is a partial schematic block diagram showing an implementation of the computer device of FIG. 1.

FIG. 2 is a partial schematic block diagram showing one implementation of the computer device 100.

According to the block diagram, the computer device 100 includes a processor 224 coupled to a memory storage device 226. In general, the memory storage device 226 stores software with instructions to help the computer devices 100 implement various techniques disclosed herein. The memory storage device 226 also generally stores other data to facilitate the implementation of those techniques, including, for example, a collection of pre-recorded or computer-generated audio versions of phonemes that correspond to the grapheme-labeled regions on the touchscreen 104. Moreover, in some implementations, the memory storage device 226 includes multiple versions of at least some of the phonemes, with each version, for example, having a different coarticulation and/or duration. In a typical implementation, if one or more of the phonemes (or pronunciation of letters or combination of letters) lend themselves to being or co-articulated in a number of different ways, then the memory storage device 226 can store one version of the phoneme for each possible coarticulation.

In the illustrated implementation, the software loaded from memory storage device 226 into processor 224 running software, has a timing module 228, a speed calculating module 230, a phoneme selection module 231, a phoneme timing module 232 and a concatenation module 234. It will be understood that some implementations will not include all of these modules.

The timing module 228 is coupled to the touchscreen 104 and to the speed calculating module 230. In a typical implementation, the timing module 228 receives information from the touchscreen about grapheme-labeled regions that have been touched by a point device measures an amount of time that the pointing device is in contact with each one of the grapheme-labeled regions on the touchscreen 104 that the pointing device touches or moving between those regions.

The speed calculation module 230 is coupled to the timing module 228 and to the phoneme timing module 232. In a typical implementation, the speed calculation module 230 receives information from the timing module 228 regarding how long the pointing device contacted one or more of the grapheme-labeled regions on the touchscreen 104 or the space between regions. Based on this information and information about the physical size of each labeled region on the touchscreen, for example, the speed calculation module 230 calculates a speed with which the pointing device is moving across various portions of the touchscreen 104. In a typical implementation, the speed calculation module 230 calculates a pointing device speed across each of the respective grapheme-labeled regions touched by the pointing device.

The phoneme selection module 231 is coupled to the touchscreen 104, to the electronic database 226 and to the phoneme timing module 232. In general, the phoneme selection module 231 receives an indication from the touchscreen 104 about which of the labeled regions 104 on the touchscreen 104 has been (or is being) touched by the pointing device. Based, at least in part, on this information, the phoneme selection module 231 selects among the available phonemes in the memory storage device 226 an appropriate phoneme to be articulated at the audio speaker 106. In some implementations, the phoneme selection module 231 selects an appropriate one of the available phonemes based only on a single indication that a particular one of the labeled regions has being touched. Alternatively, the phoneme selection module 231 selects an appropriate one of the available phonemes based on other factors (e.g., a previously touched grapheme-labeled regions or grapheme-labeled regions predicted to be touched next).

In some implementations, the database has audio recordings (digital audio files) of a number of phonemes, including the phonemes by themselves, in case only one phoneme is touched, and the coarticulated versions, e.g., the "a" in (r)a (m), identified by the triphone containing the sound. (The preceding and following phonemes can "color" the sound in the middle.) Thus, in a typical implementation, there are far more than 40 sounds recorded prior to launching the program if a coarticulation feature is implemented.

The phoneme timing module 232 is coupled to the phoneme selection module 231 and to the speed calculating module 230. In a typical implementation, the phoneme timing module 232 receives a phoneme from the phoneme selection module 231 and an indication of pointer speed across the corresponding labeled region on the touchscreen 104 or across a previously-touched or subsequently-touched labeled region. Based on one or more of these pieces of information, the phoneme timing module 232 sets an audible duration for the selected phoneme; it also may specify an onset time for a phoneme as well.

In some implementations, the processor 224 may not include a speed calculating module 230. In those implementations, the phoneme timing module 232 may be coupled directly to the timing module 228 and the audible duration and/or onset time can be set by the phoneme timing module 232 based on the amount of time that pointing device is in contact with one of the corresponding labeled regions on the touchscreen, as measured by the timing module 228.

The concatenation module 234 is coupled to the phoneme timing module 232 and is generally adapted to concatenate one or more phonemes that are to be (or are being) produced at the audio speaker 106 in a sequence. In a typical implementation, concatenation helps a word or the portion of the word produced at the audio speaker 106 sound substantially continuous and like the word or portion of the word to be (or being) pronounced without any unnatural pauses. In one variation, if the speed across the regions is very fast, a stored recording of the whole word pronounced naturally may be produced or the speed may be adjusted to a slower pace, rather than reflecting the speed of the touch. Conversely, if a single region is touched and the touch remains for a long time without movement, a shorter version of the phoneme corresponding to that region may be spoken; this may be a necessity if the phoneme is non-sustainable, such as a stop consonant such as "p".

The audio speaker 106 in the illustrated implementation is coupled to the concatenation module 234 and is adapted to produce one or more phonemes (e.g., a sequence of phonemes that form a word or word portion), where one or more of the phonemes has a duration that is related to the pointing device's movement across the touchscreen 104. Moreover, in some implementations, one or more of the phonemes has an onset that relates to the pointing device's movement across the touchscreen 104.

Figure 3:
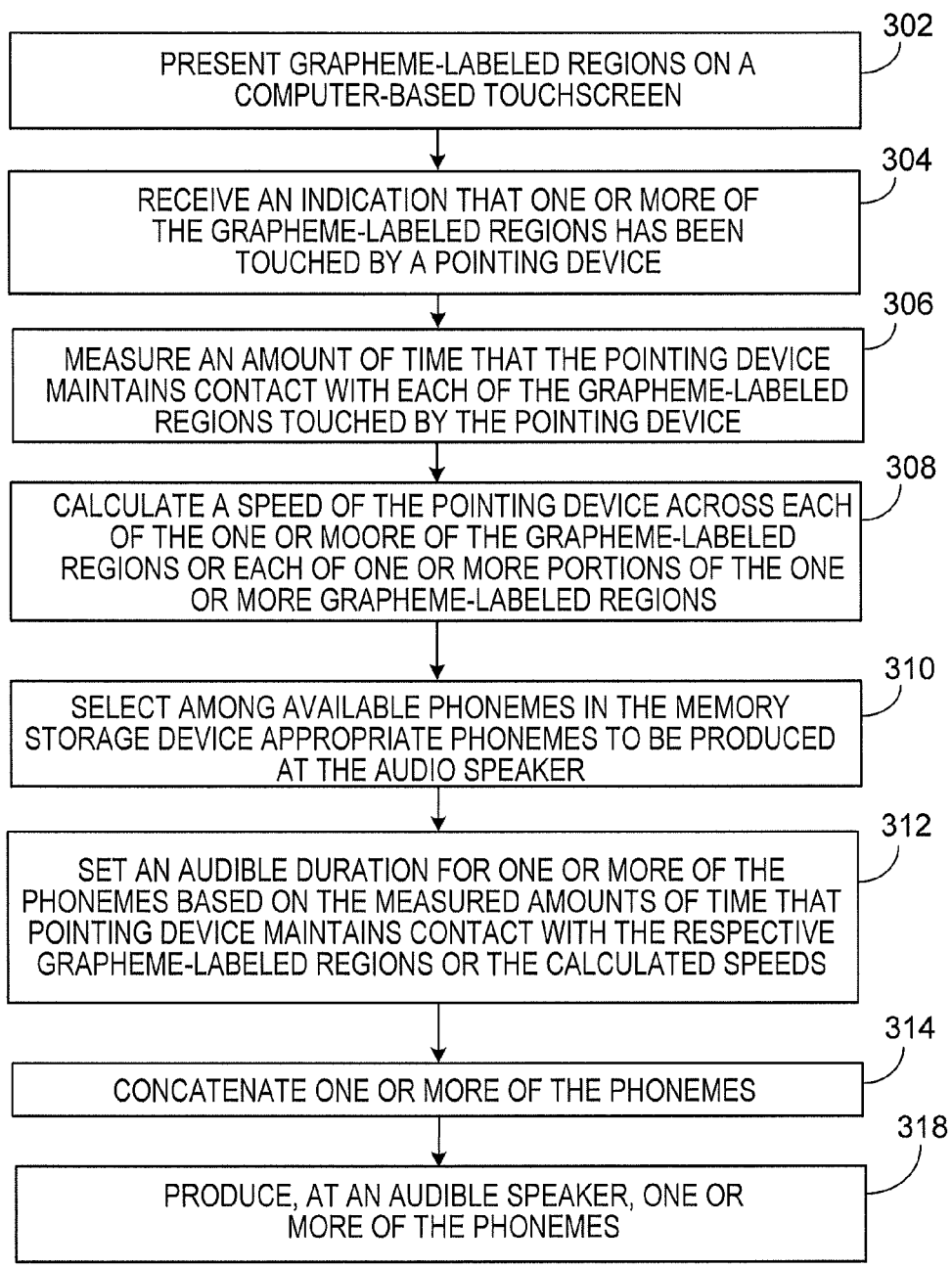
FIG. 3 is a flowchart showing one implementation of a method for producing a phoneme at an audio speaker in the computer device of FIG. 2.

FIG. 3 is a flowchart of a method of producing one or more phonemes at the audio speaker 106 of the computer device 100 in FIGS. 1 and 2.

According to the illustrated method, the computer device 100 presents (at 302) multiple grapheme-labeled regions on its computer-based touchscreen 104. The grapheme-labeled regions can have visible or invisible barriers. The visible barriers may be at the edge of the regions or the regions may extend beyond the visible barriers. They can be arranged in a variety of ways, for example, in a single straight row, or multiple rows, or multiple columns with a different number of regions in one or more of the columns. Each grapheme-labeled region can include one or more letters.

The processor 224 receives (at 304) an indication that one or more of the grapheme-labeled regions on the touchscreen has been touched by a pointing device, such as a user's finger. Typically this indication also specifically identifies which of the grapheme-labeled regions (e.g., "m" in the leftmost column, "ai" in the middle column or "de" in the rightmost column) has been touched. In some instances, the computer device continues to receive the indication for as long as the grapheme-labeled region is being touched.

The timing module 228, typically in response to the indication that one of the grapheme-labeled regions has been touched, starts a timer (at 306) to measure an amount of time that the pointing device maintains contact with the grapheme-labeled region (or with a section/rule-region in the touched grapheme-labeled region). Typically, the timing module 228 starts timing as soon as the indication is received. Typically, the timing stops when there is no longer an indication that the grapheme-labeled region is being touched (e.g., when the pointing device moves out of contact with the grapheme-labeled region) or when an indication is received that the pointing device has touched (or is touching) a different, subsequent one of the grapheme-labeled regions.

The speed calculating module 230 calculates (at 310) a speed associated with the pointing device's movement across the touchscreen 104. This calculation can be performed in a number of ways. For example, it can be done based on information received from the timing module. More particularly, given a known physical distance (e.g., across part of the touchscreen, across a grapheme-labeled region, across a portion of a grapheme-labeled region, etc.) and a traversal time for that known distance as measured by the timing module 228, the speed of the pointing device can be calculated.

In response to the indication that one or more grapheme-labeled regions has been touched, the phoneme selection module 231 (at 310) selects among available phonemes in the memory storage device 226 an appropriate phoneme or phonemes to be produced at the audio speaker 106. Typically, the selected phoneme or phonemes will be those that most closely correspond to the grapheme or graphemes that appear on the touched grapheme-labeled region(s). The phoneme selection module 231 provides electronic versions of the one or more selected phonemes to the time setting module 232.

The time setting module 232 receives the electronic version of the selected phoneme from the phoneme selection module 231. The time setting module 232 also receives an indication from the timing module 228 about how long the pointing device maintained contact with one or more of the grapheme-labeled regions or an indication from the speed calculation module about how the speed of the pointing device across the touchscreen. Based on this information, the timing module 232 sets (at 312) an audible duration for one or more of the phonemes to be produced (or being produced) at the audio speaker. In some implementations, this may include setting one or more onset times for one or more of the phonemes to be produced.

In various implementations, the timing setting module 232 may set the duration and/or the onset time for a particular one of the phonemes based on timing and/or speed of a pointing device relative to one or more corresponding grapheme-labeled regions, one or more grapheme-labeled regions touched before the corresponding grapheme-labeled region, or one or more grapheme-labeled regions touched after the corresponding grapheme-labeled region.

In certain instances, the onset of a particular phoneme can be influenced on whether the phoneme is sustainable (i.e., whether its pronunciation can be extended—like "a" in "ran" or "f" in "fan" which are sustainable—or whether its pronunciation cannot be extended like "p" in "push," which is not sustainable).

For example, in response to the timing module 228 or speed calculation module 230 identifying an extended touching interval for a grapheme-labeled region that corresponds to a phoneme with a pronunciation that is not sustainable, the timing setting module 232 can introduce a delay before producing the phoneme associated with the touched grapheme-labeled region and extend pronunciation of a preceding phoneme, if there is one. Similarly, in response to the timing module 228 or speed calculation module 230 identifying an extended touching interval for a grapheme-labeled region that corresponds to a phoneme with a pronunciation that is not sustainable, the timing setting module 232 can introduce a delay before producing the phoneme associated with the touched grapheme-labeled region and initiate pronunciation of a subsequent phoneme earlier than it otherwise would have initiated the pronunciation.

If the phoneme is sustainable and the circumstances call for an extended duration, then, typically, the timing setting module 232 sets an extended duration for the phoneme.

According to the illustrated method, the concatenation module 234 concatenates (at 314) one or more of the phonemes.

The audio speaker 106 produces (at 318) a phoneme (or a sequence of phonemes, as a word or word portion), where the phoneme or one or more of the phonemes in the sequence has a duration that is related to the pointing device's movement across the touchscreen 104. More particularly, in some instances, the phoneme or one or more of the phonemes in the sequence has a duration that is related to the pointing device's movement across portions of the touchscreen 104 that relate to corresponding grapheme-labeled regions.

Typically, the audio speaker 106 produces a sequence of phonemes in response to the pointing device contacting a sequence of grapheme-labeled regions and each phoneme in the sequence corresponds to a respective one of the graphemes.

Moreover, in a typical implementation, the audible duration associated with the respective one or more phonemes produced at the audio speaker can be directly proportional to the measured amounts of time that the pointing device contacted or calculated speeds of the pointing device relative to corresponding grapheme-labeled regions.

Figure 4:
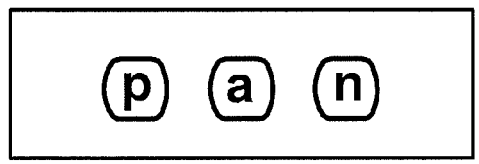
FIG. 4 is a partial screenshot showing a visible display of grapheme-labeled regions on the touchscreen of the computer device in FIG. 1.

FIG. 4 shows a partial screenshot of a computer device (e.g., computer device 100) where a word spelling is represented by a group of on-screen regions labeled with graphemes and arranged in a proper sequence where one word is represented. In the illustrated implementation, the word is "pan." Graphemes are not equivalent to letters. A grapheme may be represented by, for example, multiple letters. The grapheme "ea," for example, is two letters, but produces one sound (one phoneme), such as in "pear." The "tt" in "letter" is pronounced as one "t" sound, as another example, and would typically constitute the label for one grapheme.

Each region in the illustrated example covers a screen area that includes the grapheme image and is appropriately sized to allow a large pointer like a finger to be less precise when touching smaller images. That region may be delineated with a boundary as shown or the region may be virtual, that is, not visible.

In a typical implementation, in order for the computer device 100 to react to a pointing device touching the screen, the regions on the screen must be traversed in a particular direction (e.g., left-to-right) by the pointing device. During its movement, the pointing device maintains continuous contact with a region for some time interval (i.e., a "touch interval"). After the pointing device breaks contact with a region, it can either re-establish contact with the same region (e.g., if it accidentally moved outside the region and subsequently re-entered it, or briefly lost contact with the touch-screen), establish contact with another region (e.g., an adjacent region) in the direction of the traversal (if one remains), or end the traversal. A contact with any other region besides one that is in the required direction can, in some instances, indicate to the computer device that a particular traversal has been completed. In that instance, the computer device may stop all related sound production and reset to start a new traversal from that region.

A break in contact exceeding certain (region-specific) duration typically ends the traversal and causes the computer device to begin a new traversal and a new pronunciation when a subsequent region is touched. In some instances, the computer device is adapted so that a momentary break in contact or slight deviation outside the region is treated as if there were no break or no deviation. In such instances, the computer device may continue a sound that admits of elongation or complete a sound if it does not.

A particular special case that occurs in reading education is the touching of a single grapheme region with no significant movement, for example, if a student wishes to hear the phoneme corresponding to that grapheme. In that case, the sound of the phoneme is produced, sustained while touched if sustainable, or pronounced once if not.

In some implementations, the speed of the pointer is estimated by the speed calculating module based on information provided by the timing module by computing a distance traveled over a short time interval that is related to the size of the grapheme regions and the total width of the region containing the displayed grapheme regions, e.g., one-twentieth of the full distance; call this distance D. This parameter "D" can be adjusted by experimentation, but typically should be small enough that the initial speed can be estimated quickly. The speed used to set a duration in some embodiments is the average of multiple speeds computed over a sequence of intervals of width D after a first touch/click of a particular one of the regions. This can be weighted to favor more recent intervals.

According to certain implementations, the speed can be calculated using the following formula:

$$S(N)=\text{SUM}_{n=1,N}(w_n*D/t_n)/\text{SUM}_{n=1,N}(w_n),$$

where there have been N intervals, and $t_n$ is the amount of time (e.g., as measured by the timing module 228) it takes the pointing device to transit the distance D in the $n^{th}$ interval. In some embodiments, the weights may be decreased for older time periods, according to the following formula:

$W_{n+1}=a*W_n$, where a is a constant, a>1.

With this methodology, the sequential traversal of the regions by a moving pointing device produces ("sounds out") an acoustic utterance of the word based on the phonemes corresponding to the graphemes/symbols in the word context. (We will use term "phoneme" instead of "allophone" unless we stress phonetic variation/co-articulation due to word's context.)

Some phonemes can be uttered in a sustained phonation (e.g., vowels or sibilants). Allophones of these phonemes can be extended in duration by stretching an inner acoustic segment (making it into a quasi-stationary sound). Other phonemes cannot be uttered in a sustained manner (e.g., stop consonants such as "p" and "t").

In US English, phonemes that can be uttered in a sustained manner include vowels (/ee/ in "bead", /i/ in "bid", etc.) and diphthongs (/aw/ in "bout", /ay/ in "bide", /oy/ in "boy", /ey/ or /ei/ in "bait"), liquids (/l/ in "light", /r/ in "right"), nasals (/m/ in "might", /n/ in "night", /ng/ in "song") and fricatives (/s/ in "seal", /sh/ in "shield", /zh/ in "vision", /f/ in "feel" and /v/ in "veal", etc.); those that cannot include stops (/p/ in "peak", /b/ in "beak", etc.), affricates (/ch/ in "cheek", /j/ in "jeep") and glides (/y/ in "yacht", /w/ in "wide").

As discussed herein, if the phoneme represented by a region's grapheme can be uttered in a sustained manner, its utterance duration is increased if the duration of the region's touch interval exceeds the duration of the phoneme sound (produced at a pre-defined rate of speech).

In some implementations, the computer device 100 repeats the full word fluently after a word is traversed entirely by touch (and after a short pause) in order to provide a natural pronunciation after a slower pronunciation has been sounded. The word can be similarly pronounced fluently if the touch traversal is so fast that it is obvious the user wishes to hear the whole word.

Additionally, in some implementations, the computer device 100 provides a visual feedback of the word's spelling traversal synchronized with the start and/or end of touch for the grapheme regions. The approach is to visually indicate that the touch is entering a grapheme region by animating the grapheme label image. One implementation is to scale the grapheme label image up upon the start of the touch for the region, and scale it down to the original size when the touch continuity is interrupted (at the end of a partial or full-word spelling traversal). For example, if a continuous traversal starts from one grapheme region and ends at another, the grapheme label images are scaled up in sequence at the start of touch for all the regions as they are traversed, and remain scaled up until the end of the continuous traversal at which time all of them are scaled down to their original size.

It is also anticipated that a user (e.g., a child trying to learn how to read) may touch individual symbols to hear the corresponding sound. If so, the symbols are sounded out with the sound that is appropriate in context to the surrounding symbols. If this is ambiguous, the system may use one or the following options, for example: a make no sound; or b) make two or more sounds to show that in the context shown more than one sound for the symbol is possible.

For most of the words of the US English lexicon, a word's spelling can be uniquely represented with a sequence of graphemes possibly starting with a prefix and/or ending with a suffix. We will denote a set of these words as GW (Grapheme Words). For other words—"sight-words" that can only be learned as exceptions such as the words "the" (pronounced "thuh") or "two" (where the "w" is obviously not pronounced)—we will treat the entire spelling as a single unit, and denote a set of such words as SW (Sight Words).

A key issue for a traversal of a word's grapheme regions is to preserve continuity of speech utterance in cases where the duration of a phoneme (allophone) cannot be extended by a sustained phonation to match the duration of a touch interval for a corresponding grapheme region. Another key issue for a traversal of a word's grapheme regions is to preserve sound continuity for "fast" transitions from one region to the next. In some implementations, these issues are addressed by implementing one or more of the following techniques:

1. Introducing a brief delay in sound production for a grapheme region representing a non-sustainable phoneme (called "non-sustainable region") allowing an adjacent grapheme region representing a sustainable phoneme (called "sustainable region") to be reached in time to avoid sound discontinuity; this delay can be either a pre-defined constant (region-specific), or can be based on an estimate of the remaining duration before the adjacent grapheme region is reached (based on a calculated speed of movement of the pointer). If more than one adjacent grapheme region can be reached, the next region to be reached is predicted first.
2. Extending the phoneme sound from a preceding sustainable region (if any) into one or more non-sustainable regions to cover for the above delay of sound production.
3. Ignoring a brief interruption in touch continuity to cover a minimal duration of an inter-region transition or a short break of contact with a touch-screen.

In certain implementations, the touch interval (i.e., the time that the pointing device maintains contact with a particular region, as measured by the timing module) of a non-sustainable region is initially ignored for a certain duration (based on a "fast" traversal of this region). The phoneme sound for a sustainable region can be extended as needed up to a predefined maximum duration as the touch moves into one or more adjacent regions. This preserves continuity of speech utterance for a "fast" traversal of the grapheme regions. Additionally, a touch interruption is initially ignored for a predefined duration to preserve continuity of speech utterance while quickly crossing gaps between the regions or briefly breaking contact with the touch-screen.

In these implementations, two parameters can be noted for every grapheme region: starting continuity time threshold (SC) and ending continuity time threshold (EC). SC defines the maximum duration by which the start of a continuous touch interval for a region is initially ignored before a region-related sound production commences. EC defines the maximum duration by which an interruption in touch continuity for a region is initially ignored before a region-related sound production ceases. The significance of these thresholds is illustrated in Examples 1, 2 and 3 below.

In some embodiments, the sound that a symbol (e.g., a grapheme, a letter or combination of letters) should represent can be obtained by using a phonetic dictionary. Note that the sounds recorded and concatenated by the methods described herein can reflect many variations. For example, a phoneme in a stressed syllable can be recorded differently than in an unstressed syllable. One can also choose to record differently a phoneme based on coarticulation with surrounding sounds; the recording can depend on the "triphone" (three sound context) in which the phoneme is embedded. For simplicity, this is referred to simply as "phoneme" or "sound" herein.

The sounds can be taken from a database of small audio segments stored, for example, in memory storage device 226. The sounds can be concatenated, with transitions smoothed. Alternatively, with a full word that is part of a reading lesson, for example, the full word can be recorded as a whole, and parts marked as segments. The full word can then be played with perfect naturalness when the letters are swiped quickly, and the word fully pronounced. When the transition is slower, the segments can be stretched by repeating the parts that can be stretched, or by delaying the start of a segment as discussed in more detail in following sections.

In certain implementations, the techniques disclosed herein:

4. Produce a natural-sounding speech utterance of a word in real time by a user touching on-screen regions labeled with graphemes comprising a word's spelling; and/or
5. Control the duration of the constituent phonetic sounds (i.e., the speaking rate) by synchronizing substantially real-time sound production with the start and end of touch intervals for each grapheme of the word's written form.

In some implementations, a user move a pointing device (e.g., his or her finger) over grapheme regions of a word's spelling in any order either maintaining continuous contact between the pointing device and the touch-screen, or interrupting it for certain lengths of time. Certain implementations of the techniques disclosed herein interpret any such movement as a series of left-to-right traversals of contiguous segments of the grapheme regions covering a partial/full word's spelling. The computer device (e.g., device 100), thus, produces speech sounds for every traversal of a partial/full word's spelling in substantially real time while substantially maintaining synchronization between the start/end of touch intervals of grapheme regions and the sound production for the corresponding phonemes. The computer device 100 controls the speaking rate of a speech utterance by matching the duration of phonetic sounds with the duration of the touch intervals utilizing sustained phonation typically when this is available. The computer device 100, in certain embodiments, attempts to preserve continuity of a speech utterance by: (1) briefly delaying sound production for non-sustainable phonemes allowing them to coalesce with an adjacent phoneme or phonemes for a fast-moving touch; (2) extending the sound of sustainable phonemes to cover such delays; and/or (3) ignoring brief interruptions in touch continuity. If more than one word's spelling is represented with the set of grapheme regions, a prediction of the next region to be touched can be made (e.g., based on the pointing device's movement across the touchscreen) to allow for an unambiguous selection of the grapheme's associated sound based on its adjacent right context.

One embodiment of the algorithm for implementing various aspects of these techniques is described as follows.

A group of grapheme-labeled regions representing a word's spelling is presented at a touchscreen 104 of a computer device 100. These grapheme-labeled regions can be traversed in a given direction (left-to-right) by a moving pointing device (touching finger, mouse, etc.). During its movement, the pointing device maintains a continuous contact with a region for some time interval ("touch interval"). After the pointing device breaks contact with a region, it can either establish contact with the same region, an adjacent region in the direction of the traversal (if one remains), or end the traversal. A subsequent contact with any other region implies ending the traversal at the previous region (also ceasing the related sound production) and starting a new traversal from that region. A break in contact exceeding certain (region-specific) duration ends the traversal.

Particular implementations of the techniques described herein are described below. In describing these implementations, it is helpful to define the following parameters:

GS refers to a word's spelling using a sequence of graphemes $g_j$. GS=$\{g_j, j=1, \ldots, L\}$ where L is the number of the graphemes in the sequence, where L>=1 (e.g., GS=$\{r,ai,n\}$ for "rain"). The same grapheme may appear more than once, e.g., GS=$\{p,o,p\}$.

$GS_{m,n}$ refers to a segment of a word's spelling (GS) starting at the grapheme $g_m$ and ending at the grapheme $g_n$. $GS_{m,n}$=$\{g_j, j=m, \ldots, n\}$, where 1<=m<=n<=L (e.g., $GS_{2,3}$=$\{ai,n\}$ in "rain".

PS refers to a word's phonemic transcription using a sequence of phonemes represented by the graphemes from GS. PS=$\{p_j, j=1, \ldots, L\}$ where the phoneme $p_j$ is represented with the grapheme $g_j$ (e.g., PS=$\{/r/, /ei/, /n/\}$, where /r/, for example, denotes a specific phoneme's sound as opposed to a grapheme representation.

$PS_{m,n}$ refers to a segment of a word's phonetic transcription (PS) starting at the phoneme $p_m$ and ending at the phoneme $p_n$. $PS_{m,n}$=$\{p_j, j=m, \ldots, n\}$, where 1<=m<=n<=L (e.g., $PS_{2,3}$=$\{/ei/,/n/\}$).

Note: Depending on its position in the word's spelling (GS), the same grapheme may represent different phonemes (e.g., the grapheme "a" in GS=$\{a,b,a,ck\}$, for "aback" represents both /uh/ and /a/. PS=$\{/uh/,/b/,/a/,/k/\}$).

It is helpful to refer to a sequence of on-screen touch-sensitive regions as j, j=1, . . . , L, each of which being labeled with a grapheme from the word's spelling (GS) (referred to, for example, as "grapheme-labeled regions," "grapheme regions" or simply "regions"). It is further helpful to refer to a screen layout (e.g., location, shape and dimensions of each grapheme region j) is denoted as $r_j$. A screen layout for a sequence of the grapheme regions can be referred to as RS=$\{r_j, j=1, \ldots, L\}$.

In a typical implementation, there can be gaps but no overlaps between grapheme regions. Each grapheme region covers a screen area that includes a grapheme label image, and is appropriately sized to allow a large pointer like a finger to be less precise when touching smaller images.

When a grapheme region j is touched, the phoneme $p_j$ (more precisely, its allophone in the word context) is selected, for example by the phoneme selection module 231 for speech sound synthesis and production at the audio speaker 106. The duration of the synthesized sound is controlled (as much as feasible) based on the duration of continuous (or substantially continuous) touch of the grapheme region, as determined, for example, by the timing module 228. The digitized speech sound units used by the algorithm for concatenative synthesis typically are audio files retrieved from the memory storage device 226, which may have been extracted from speech collected prior to the use of the algorithm, usually from one person who is a careful and clear speaker reading a specific prepared text or series of words. Alternatively, the speech sound units may have been synthesized using a model of the human sound production system, such as in speech synthesis systems.

$ASD_{m,n}(d_m, \ldots, d_n)$ refers to an acoustic segment for a continuous-speech utterance represented by the phoneme segment $PS_{m,n}$ provided that the grapheme regions $j=m, \ldots, n$ of the corresponding grapheme segment $GS_{m,n}$ are traversed in time $d_j$.

In some implementations, the computer device 100 has one or more (or all) of the following operational characteristics:

1. A traversal can start from any grapheme region m and end at any region n where $1<=m<=n<=L$. Any movement of a pointing device over grapheme regions $1, \ldots, L$ of a word's spelling in any order is interpreted as a series of left-to-right traversals of contiguous segments of the grapheme regions. This means that, as soon as a pointing device starts moving left-to-right (either after moving right-to-left or just starting its movement from the first grapheme region), its movement is treated as the start of a new left-to-right traversal; as long as the pointing device continue moving left-to-right, that traversal continues; as soon as the pointing device reverses direction to right-to-left, the left-to-right traversal is considered ended at the grapheme region at which the reversal has occurred, and a new left-to-right traversal is started at the grapheme region touched when the direction is reversed. If the right-to-left movement continues, the new left-to-right traversal will end on the same grapheme region on which it has started, and the next grapheme region will again be treated as a start of the left-to-right traversal, etc. So, a right-to-left movement over a sequence of grapheme regions is treated as a series of single-region "left-to-right" traversals. Therefore, right-to-left traversals are treated essentially as if the finger was lifted during the left-to-right traversal, and sounds created as if the change of direction to left-to-right were a new touch initiation. When one traversal ends, the related sound production is stopped but playback of the residual audio (if any) is allowed to continue until it is either finished, or terminated by the start of a new traversal. For example, moving a pointing device right-to-left will produce either isolated sounds of phonemes for the touched grapheme regions, or no sounds at all (depending on the speed of movement and delays in starting the sound production).

2. An acoustic segment $ASD_{m,n}(d_m, \ldots, d_n)$ of a continuous speech utterance for a corresponding grapheme segment $GS_{m,n}$ with the constituent grapheme regions j traversed in times $d_j$ is available (either pre-recorded, or synthesized in real time). The durations of the constituent allophones for the phonemes $p_j$ within the acoustic segment are matched to the traversal times $d_j$ for the corresponding grapheme regions $j=m, \ldots, n$ as closely as feasible by selecting an appropriate speaking rate using a certain match criterion. The match criterion typically minimizes a metric based on the differences between $d_j$s and the durations of the corresponding acoustic sub-segments (for example, the sum of squared differences) by selecting a speaking rate and preserving continuous speech of an utterance. For each available speaking rate, durations of the acoustic sub-segments for the constituent allophones are assumed to be known (e.g., established by a prior phonetic "forced alignment" of a pre-recorded speech using a speech recognizer, or output by a speech synthesizer). Intra-word phonetic coarticulation is preserved within the boundaries of the phoneme segment $PS_{m,n}$ but not necessarily with the word's phonetic context outside the boundaries.

3. An acoustic segment for a sustainable phoneme can be acoustically contracted during real-time (or substantially real time) playback to match a shorter traversal time of a corresponding grapheme region.

Figure 5:
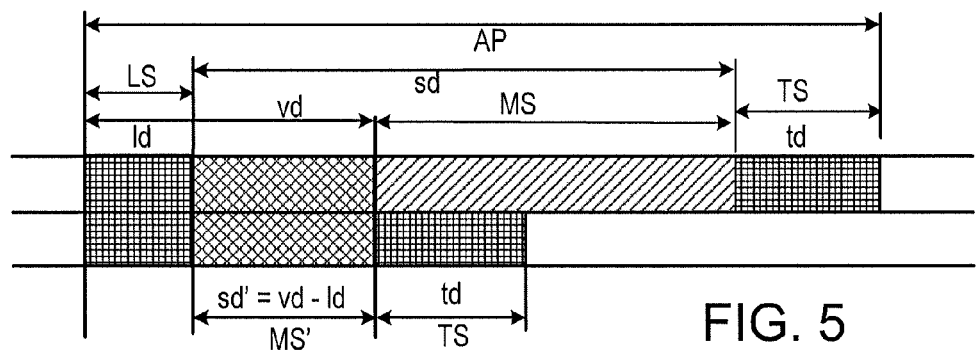
FIG. 5-7 are timing diagrams.

FIG. 5 is a timing diagram that represents one technique that can be implemented by the phoneme timing module 232, for example, to offset an acoustic segment of and set an audible duration for a sustainable phoneme.

In general, with regard to real-time (or substantially real time) contraction of an acoustic segment for a sustainable phoneme, it is noted that an acoustic segment for a sustained utterance of a phoneme p generally contains an inner sub-segment with a quasi-stationary sound spectrum. The duration of this sub-segment can vary with the duration of a sustained phonation of the phoneme while adjacent sub-segments (e.g., leading and trailing sub-segments) retain relatively constant durations.

Suppose, for example, a phoneme p is to be sustained for a relatively long duration (e.g., about 3-4 seconds). Its acoustic segment AP can be viewed as composed of three sub-segments: a leading transient (LS), a sustained quasi-stationary (MS), and a trailing transient (TS), with durations ld, sd, and td, respectively. Further suppose that this acoustic segment is offset by an amount of time vd from its beginning. If $ld<=vd<(ld+sd)$, a remaining portion of the sustained sub-segment (of the duration $rd=ld+sd-vd>0$, possibly slightly reduced to align the start and the end of the sub-segment on a pitch period) can be removed. The trailing TS sub-segment generally can be smoothly concatenated with the offset portion of the sustained sub-segment MS with minor spectral smoothing at the juncture.

In the illustrated example, acoustic segments (AP) is for a sustained phoneme and includes a leading transient (LS), a sustained quasi-stationary (MS), and a trailing transient (TS), with durations ld, sd, and td, respectively. According to the illustrated implementation, the acoustic segment (AP) is offset by an amount of time vd from its beginning, a remaining portion of the sustained sub-segment MS with a duration sd+ld−vd is removed, and the resulting shorter sub-segment MS' with the duration sd'=vd−ld is concatenated with the trailing transient TS.

Thus, the duration of a sustained phoneme typically can be reduced by removing a portion of the inner quasi-stationary sub-segment from its acoustic segment and then closing the gap generally without introducing a perceptible spectral distortion. Moreover, this can be done at any point during playback of this sub-segment before it is entirely consumed by playback. It may be desirable to provide an additional data buffer that would be used during the removal process to prevent an overrun of the portion being removed. This may provide a way to shorten the remaining duration of a partially played phoneme acoustic segment during on-going playback, to match it with a shorter duration of traversal of the corresponding grapheme region.

It can be further helpful to consider the following parameters for each grapheme region $j=1, \ldots, L$:

6. Starting Continuity threshold $SC_j$: refers to the maximum duration by which the start of the sound playback for the region's phoneme is delayed relative to the start of the touch interval.
7. Ending Continuity threshold $EC_j$: refers to the maximum duration by which an interruption of the region's continuous touch is ignored ($EC_j > SC_j$ must hold for every j).
8. Time-Out threshold $TO_j$: refers to the maximum duration of the phoneme (and all its allophones) represented by the region's grapheme.
9. Concatenation Continuity threshold $CC_j$: refers to the minimum duration of an acoustic segment of the phoneme $p_j$ suitable for concatenation with an acoustic segment of another phoneme.

In some implementations, an audio queue (AQ) is provided to hold audio data while it is played at the audio speaker 106, for example. Playback consumes audio from the head of the AQ. New acoustic segments are appended to the tail of the AQ. A fixed section of the AQ adjacent to the head cannot be modified; it contains audio buffered and ready to be played/being played. The remaining sections of the AQ (e.g., those adjacent to the tail) can be modified (i.e., updated, deleted, substituted). Playback typically stops if the AQ becomes empty. Then, if new audio data is appended to the empty AQ, playback restarts.

Assume that a user traverses a sequence of adjacent grapheme regions $j=m, m+1, \ldots, n$ (left-to-right, $1<=m<=n<=L$) touching a region j for a continuous touch interval of duration $ct_j$, then interrupting the touch for a continuous break interval of the duration $cb_j$. Interruption occurs while transitioning to the adjacent region over an inter-region gap or ending the traversal at the region $j=n$ (the end of the sequence). In some implementations, if a region $j'<j$ were to be touched after region j (breaking the left-to-right sequence of the adjacent grapheme regions), this would end the on-going traversal, stop residual playback (e.g., by emptying the AQ), and start a new traversal from the region j'. Also assume that a region $j'>n$ (if any) touched after the region $j=n$ is not $n+1$. At that point, the computer device 100 considers the new traversal to be started at that region.

For a region j, the following traversal events can be defined: $SOT_j$ ($EOT_j$), which occur at the time of the start (the end) of a touch interval; and $EOSC_j$ ($EOEC_j$), which occur as the starting (the ending) continuity threshold $SC_j$ ($EC_j$) is exceeded. $SOT_j$ and $EOT_j$ events occur unconditionally. An $EOSC_j$ event typically occurs only if the combined duration of the touch and break intervals (also called "traversal time") $d_j = ct_j + cb_j$ exceeds $SC_j$. An $EOEC_j$ event typically occurs only if the duration of the break interval $cb_j$ exceeds $EC_j$.

In some implementations, repeated touches of the same grapheme region j (e.g., one touch after another) can be treated as one continuous touch as long as $cb_j$ does not exceed $EC_j$. In such instances, the computer device 100 may reset $ct_j' = ct_j + cb_j$, and $cb_j' = 0$ upon a repeated touch. After an $EOEC_j$ event occurs, the subsequent repeated touch of the region j can be treated as breaking the left-to-right sequence.

An algorithm in this regard may be outlined as follows. As the grapheme regions are traversed in a left-to-right sequence, EOSC events occurring at regions $m<=n_0<n_1<\ldots<n_e<n$ (due, for example, to the conditions stated above) trigger production of speech utterances for the grapheme segments spanning regions between m and $n_0$; $n_0+1$ and $n_1$; $n_1+1$ and $n_2$; $\ldots$; $n_e+1$ and n (more precisely, for the related phoneme segments). The resulting acoustic segments are appended to a streaming audio queue AQ (possibly after concatenation to the available acoustic segments at the AQ tail) and are played at the audio speaker 106. A more detailed description of this process follows.

The first acoustic segment is simply appended to the streaming audio queue. By the time the second acoustic segment is appended, the previously appended (queued) acoustic segment will have been partially consumed (i.e., prepared for playing/being played). If a sufficient tail portion of the queued segment is still available (after further withholding of an additional data buffer that would be consumed during processing), it is concatenated with the second segment. In the process of concatenation, the remaining duration of the (possibly, partially-played) last phoneme's sub-segment of the queued segment may be shortened, to match it with a shorter duration of the traversal of the grapheme region corresponding to the last phoneme. After concatenation, the resulting acoustic segment is substituted for the concatenated tail portion of the queued segment. If an available tail portion of the queued segment is insufficient for concatenation (e.g., the streaming audio queue is empty), the second acoustic segment is appended to the AQ.

In some implementations, if for some $j^*<j$ an intervening $EOEC_{j^*}$ event occurs between two successive events $EOSC_{j^*}$ and $EOSC_j$ (i.e., the touch was interrupted "long enough"), no concatenation is performed with the acoustic segment produced by the $EOSC_j$ event. However, shortening of the duration of the last phoneme's sub-segment of the queued acoustic segment produced by the $EOSC_{j^*}$ event may be performed at the time of the $EOEC_{j^*}$ occurrence.

Here the handling of traversal-related events is discussed in more detail.

As the grapheme regions are traversed in a left-to-right sequence, one or more $EOEC_j$ events can occur (e.g., this event must occur at the last region $j=n$). Due to the typical enforced constraints $EC_j > SC_j$, an occurrence of an $EOEC_j$ event implies an occurrence of an $EOSC_j$ event. Let us consider possible occurrences of EOSC and EOEC events: (a) the first $EOSC_j$ occurs; (b) an $EOEC_j$ occurs (implying an $EOSC_j$ has previously occurred); (c) an $EOSC_j$ occurs after an $EOSC_{j^*}$ event has occurred ($j>j^*$); and (d) an $EOSC_j$ occurs after an $EOEC_{j^*}$ event has occurred. In some implementations, for (a), the computer device 100 sets an index $j'=m$; for (c) and (d) the computer device sets $j'=j^*+1$.

In (a), (c), (d), an $EOSC_j$ occurrence triggers production of a speech utterance (an acoustic segment) for the grapheme segment $GS_{j',j}$ starting at region j' and ending at region j, $j'<=j$. (Note that production of an acoustic segment has been deferred until the $EOSC_j$ event occurrence.) The acoustic segment $ASD_{j',j}(d_{j'}, \ldots, d_j)$ corresponding to the grapheme segment $GS_{j',j}$ (more precisely, to the related phoneme segment $PS_{j',j}$) is produced using the traversal times $d_k = ct_k + cb_k$ already accrued for the regions $k=j', \ldots, j-1$; and an upper limit $d_j = TO_j$ for a yet-to-accrue traversal time $d_j$ of region j. The durations of the constituent allophones for the phonemes $p_k$ within the acoustic segment are matched to the traversal times $d_k$ for the corresponding grapheme regions $k=j', \ldots, j$ as closely as feasible by selecting an appropriate speaking rate using the previously described match criterion. The duration of an acoustic sub-segment for the phoneme $p_j$ is forced to be as long as feasible (up to $TO_j$). If the phoneme allows a sustained phonation, this duration can be "naturally" achieved for the $TO_j$ values of about 3-4 seconds. Otherwise, the duration is selected based on the phonetic properties of allophone $p_j$ as a result of the minimization of the match criterion for the entire acoustic segment $ASD_{j',j}(d_{j'}, \ldots, d_j)$.

Case (a):

When the first $EOSC_j$ occurs (j'=m), the produced acoustic segment $ASD_{j',j}(d_{j'}, \ldots, d_j)$ is appended to a streaming audio queue AQ.

Case (b):

When an $EOEC_j$ event occurs, an available queued acoustic segment QS at the tail of the AQ ends on a (perhaps partially-consumed) sub-segment $AP_j$ produced for the phoneme $p_j$. If this sub-segment is sustained, its remaining duration can be reduced (under the conditions described below) to fit the traversal duration of the region j, $d_j=ct_j+EC_j$. This reduction can be performed by a "shortening" procedure (procedure T1) as shown, for example, in FIG. 6.

Figure 6:
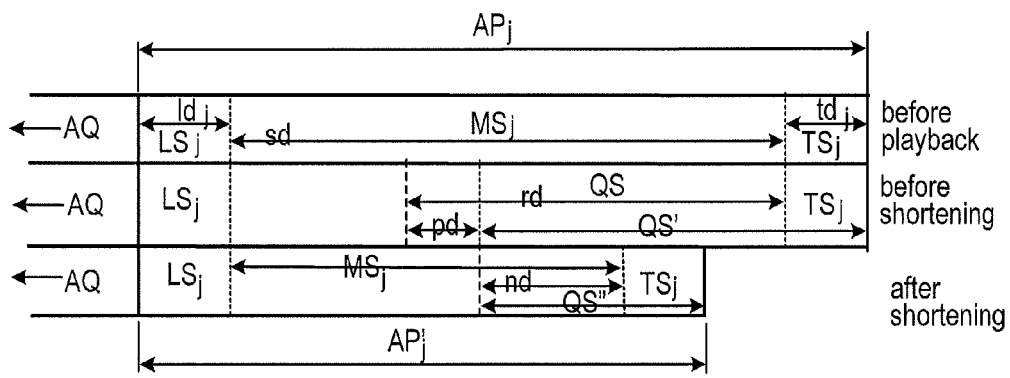

FIG. 6 shows a timing diagram that represents a technique that can be implemented by the phoneme timing module 232, for example, to shorten a sustained sub-segment $MS_j$ of an acoustic segment $AP_j$ for a sustained phoneme.

As illustrated:
sd: refers to the duration of the sustained sub-segment $MS_j$;
rd: refers to the remaining duration of this sub-segment at the current state of playback from the AQ (rd<=sd);
nd: refers to the target duration of this sub-segment, set to $d_j-(ld_j+td_j)$ to account for $LS_j$ and $TS_j$; and
pd: refers to the processing duration (consumed by playback before the processing is finished).

In accordance with the illustrated timing diagram, acoustic segment $AP_j$ for a sustained phoneme is being played back. The still-unplayed portion of its sustained quasi-stationary $MS_j$ with duration rd, is offset by pd+nd (the anticipated processing duration plus the desired duration of the unplayed portion of $MS_j$). The remaining unplayed portion of $MS_j$ with the duration of rd−pd−nd is then removed, and the resulting unplayed portion of the "shortened" sub-segment $MS'_j$, with the duration nd, is concatenated with the trailing transient $TS_j$.

To reduce the $MS_j$ to a target duration nd, one can remove from the end of the $MS_j$ a section of length r1=max{sd−nd, 0} or r2=max{rd−pd, 0}, whichever is smaller: remd=min{r1, r2}.

The resulting new duration (including a portion already consumed by the playback) is nd'=sd−remd.

If r1<=r2 then nd'=sd−max{sd−nd,0}=min{nd, sd}, and the target duration can be achieved within the limits of the entire $MS_j$ segment;

If r1>r2, then nd'=sd−max{rd−pd, 0}=min{sd−rd+pd, sd}>nd, and the new duration will exceed the target duration (e.g., it is "too late" to achieve it).

As can be seen, if nd>=sd or rd<=pd, no shortening of the $MS_j$ can be made. Otherwise (if nd<sd and rd>pd), the shortening procedure can be attempted.

To perform the removal, the available acoustic segment QS at the tail of the AQ is offset by pd (the processing duration), and the resulting segment QS' is copied. Next, the section of the duration remd is removed from the end of the sub-segment $MS_j$ of the QS' copy, and the gap is closed. Finally, the resulting shorter segment QS" is substituted for the original segment QS' in the AQ. If, at the completion of the above processing, the original segment QS' has been "overrun" by playback, no substitution is performed.

Case (c):

When an $EOSC_j$ occurs after an $EOSC_{j*}$ event has occurred (j'=j*+1), a concatenation of the produced acoustic segment $ASD_{j',j}(d_{j'}, \ldots, d_j)$ with the available acoustic segment QS at the tail of the AQ can be attempted. The QS ends with the (perhaps partially-consumed) acoustic sub-segment $AP_{j*}$ produced for the phoneme $p_{j*}$ (as the end portion of the acoustic segment produced by the $EOSC_{j*}$ event). If the phoneme $p_{j*}$ has been sustained, the shortening procedure T1 for the corresponding sub-segment $MS_{j*}$ has to be performed before the concatenation (to match the duration of the $MS_{j*}$ to the traversal duration $d_{j*}=ct_{j*}+bt_{j*}$).

For simplicity sake, we will describe a concatenation procedure (procedure T2), that may be implemented by concatenation module 234, for example, assuming that shortening procedure T1 has been performed first. (Both procedures can be combined into one procedure and may be performed by a single module requiring less overhead.)

Figure 7:
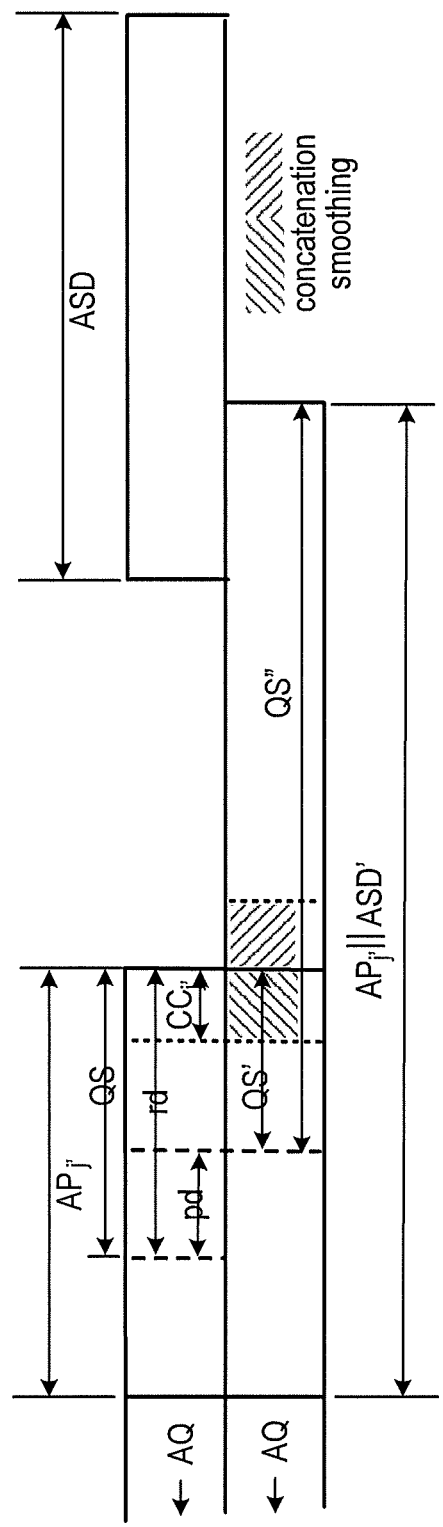

FIG. 7 is a timing diagram that represents the concatenation of segments $AP_{j*}$ and $ASD_{j',j}(d_{j'}, \ldots, d_j)$, which may be performed, for example, by concatenation module 234.

In the illustrated timing diagram:
rd: refers to the duration of the remaining portion of the sub-segment $AP_{j*}$; and
pd: refers to the processing duration (consumed by playback before the processing is finished).

In the illustrated timing diagram, acoustic segment $AP_{j*}$ is being played back. The still-unplayed portion of this segment with the duration rd is offset by pd (the anticipated processing duration). The remaining unplayed portion with the duration that exceeds $CC_{j*}$ is concatenated with another acoustic segment $ASD_{j',j}$.

The duration of the end portion of the $AP_{j*}$ available for concatenation is catd=max{rd−pd, 0}. If catd>=$CC_{j*}$, concatenation can be performed, otherwise it cannot. To approximate coarticulation and to smooth a spectral transition at the juncture of the two segments, PSOLA or a similar method can be used.

PSOLA is a speech processing technique that changes the pitch of a speech signal without affecting its duration. In PSOLA, a speech waveform is first divided into several small overlapping segments and the segments are then moved closer or apart depending on whether to increase or decrease the pitch. Then the segments are interpolated and added using an overlap add technique, so that the duration of the resultant speech waveform is the same as that of the actual waveform.

To perform concatenation, the segment QS is offset by pd; the resulting segment QS' is copied. The acoustic segment $ASD_{j',j}(d_{j'}, \ldots, d_j)$ is concatenated to the copy of the QS'. The resulting segment QS" is substituted for the original segment QS'. If, at the completion of the above processing, the original segment QS' has been "overrun" by playback, no substitution is performed. If no concatenation is performed, the acoustic segment $ASD_{j',j}(d_{j'}, \ldots, d_j)$ is appended to the AQ.

Case (d):

When an $EOSC_j$ occurs after an $EOEC_{j*}$ event has occurred (j'=j*+1), the produced acoustic segment $ASD_{j',j}(d_{j'}, \ldots, d_j)$ is appended to the AQ.

The following examples demonstrate applications of this algorithm. All of them use the word "stain" comprised of four graphemes GS={s,t,ai,n} representing phonemes PS={/s/,/t/,/ei/,/n/}.

In all of the examples, a user traverses the grapheme regions 1-4 in a sequence. SC threshold values are set to 0 for regions 3 and 4 (with sustainable phonemes /ei/ and /n/), but not for region 1 (with a sustainable phoneme /s/) and region 2 (with a non-sustainable phoneme /t/). This is done to allow a consonant cluster /st/ to be formed and co-articulated with a diphthong /ei/ when regions 1 and 2 are traversed in a quick succession.

The EC threshold for the region 4 (the last region) is set to 0, and is set to some short durations for the other regions (allowing to cross inter-region gaps w/o interruption). The TO values are set to 3 seconds for all regions (which sets the maximum duration for the sustained phonemes in regions 1 and 3-4). Finally, the CC values typically are set on the order of 60-120 milliseconds.

FIG. 8 provides a legend that relates to the examples discussed below, which relate to the examples discussed below in connection with FIGS. 9, 10 and 11.

Example 1

Figure 9:
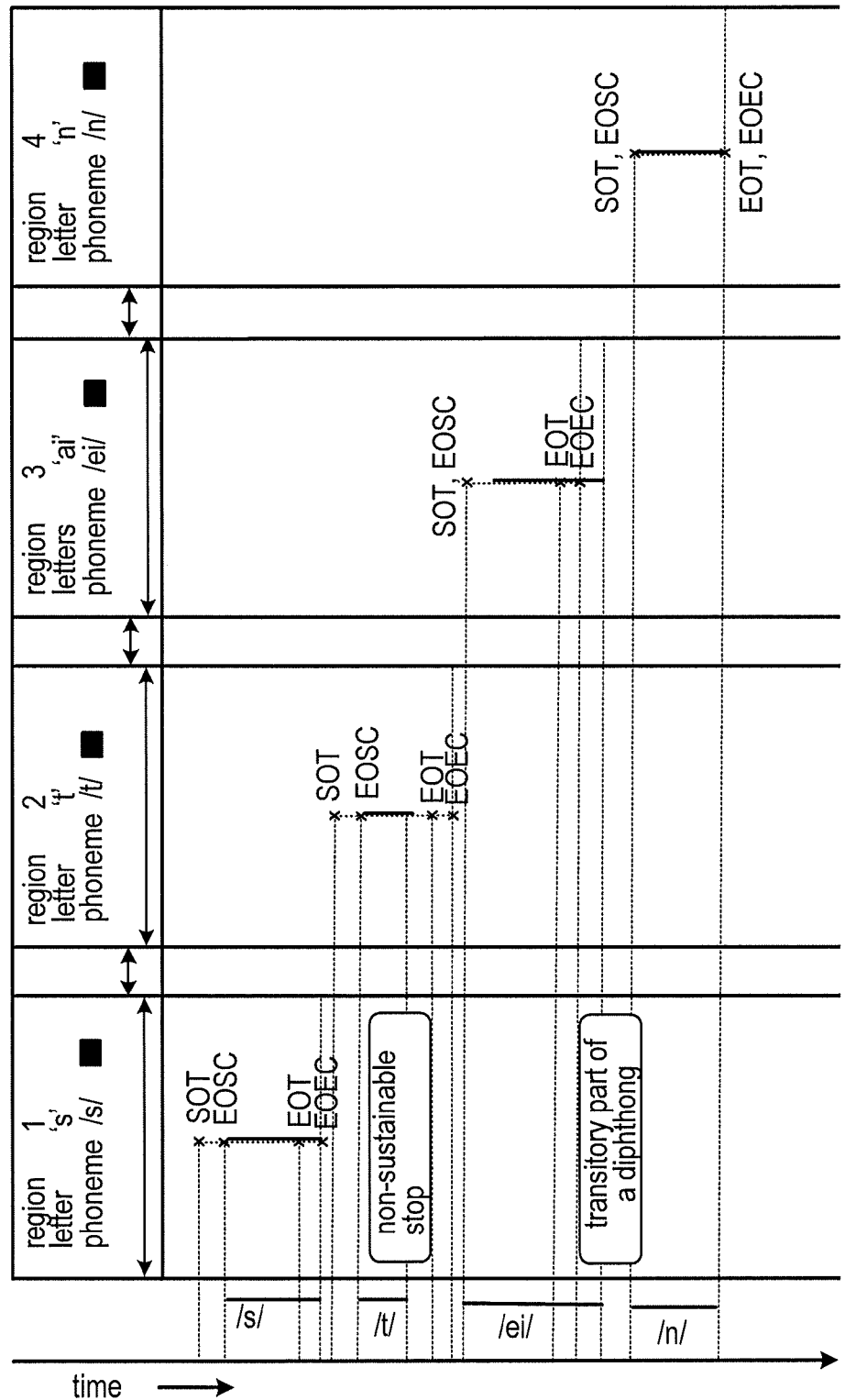
FIGS. 9-12 are timing diagrams.

See FIG. 9, with Reference to FIG. 8 for Labeling Conventions

In this example, a user touches (with a pointing device, such as his or her finger) each of the grapheme regions 1-4 in a sequence holding the finger before lifting it to touch another region. For each region, touch intervals trigger EOSC events; break intervals trigger EOEC events.

Region 1: /s/ produces an acoustic segment upon EOSC occurrence, and is sustained until the EOEC event occurs. The remaining portion of the sustained /s/ is removed by shortening procedure T1. (A very short transient exists at the end of the shortened acoustic segment.)

Region 2: /t/ cannot be sustained, so its acoustic segment ends before EOEC occurs.

Region 3: /ei/ is sustained until the EOEC event occurs. Shortening procedure T1 is performed on the remaining portion of the /ei/ acoustic segment. Note that the transient sub-segment at the end (the second vowel/off-glide of the diphthong /ei/) is re-attached after removing the excess duration within the quasi-stationary sub-segment of the first vowel.

Region 4: similar to Region 1.

Example 2

Figure 10:
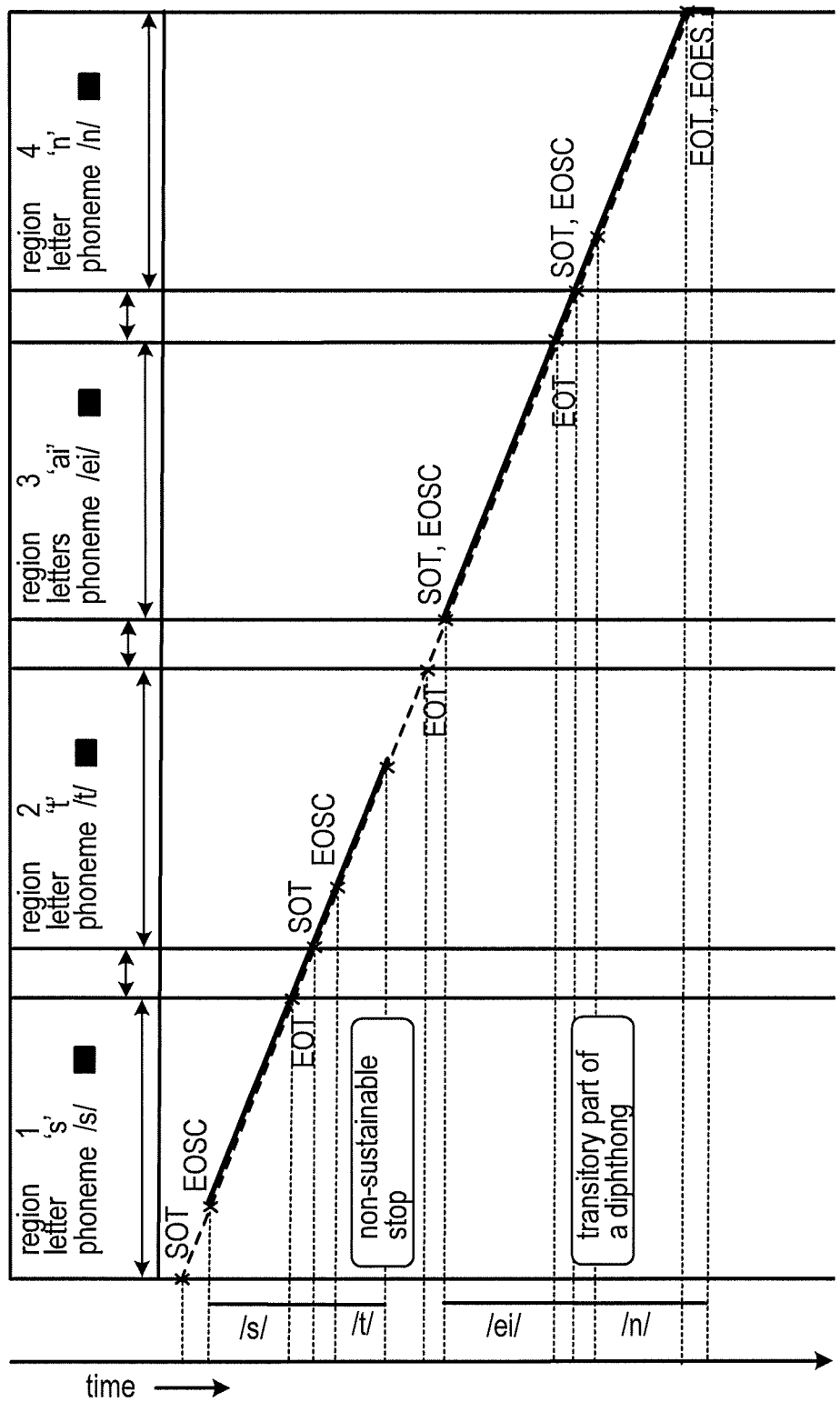

See FIG. 10, with Reference to FIG. 8 for Labeling Conventions

In this example, a user slides his or her finger across the grapheme regions 1-4 in a moderately slow sequence w/o breaking contact with the touch-screen. For each region, touch intervals trigger EOSC events; break intervals do not trigger EOEC events (except for the last region where the EC is set to 0).

Region 1: /s/ produces an acoustic segment upon EOSC occurrence, which is sustained until the EOSC event occurs at the region 2.

Region 2: /t/ produces an acoustic segment upon EOSC occurrence. The remaining portion of the sustained /s/ is shortened by shortening procedure T1, and the /t/ acoustic segment is concatenated with the shortened acoustic segment for /s/ by concatenation procedure T2 (approximating a consonant cluster /st/ as a result). The /t/ acoustic segment ends before the finger reaches the next region. At this point, an utterance discontinuity occurs.

Region 3: /ei/ produces an acoustic segment upon the EOSC occurrence, and is sustained until the EOSC event occurs at the region 4.

Region 4: /n/ produces an acoustic segment upon the EOSC occurrence. The remaining portion of the sustained /ei/ is shortened by the shortening procedure T1, and the /n/ acoustic segment is concatenated with the shortened acoustic segment for /ei/ by the concatenation procedure T2 (approximating a co-articulated /ein/ as a result). Upon EOEC occurrence, the /n/ acoustic segment is shortened by shortening procedure T1 to match the duration of the traversal d=ct+EC(0) of region 4 (the time interval from the SOT to the EOEC). After shortening, it is sustained past the EOEC occurrence (due to the transient sub-segment of the diphthong /ei/ added at the EOSC occurrence).

Example 3

Figure 11:
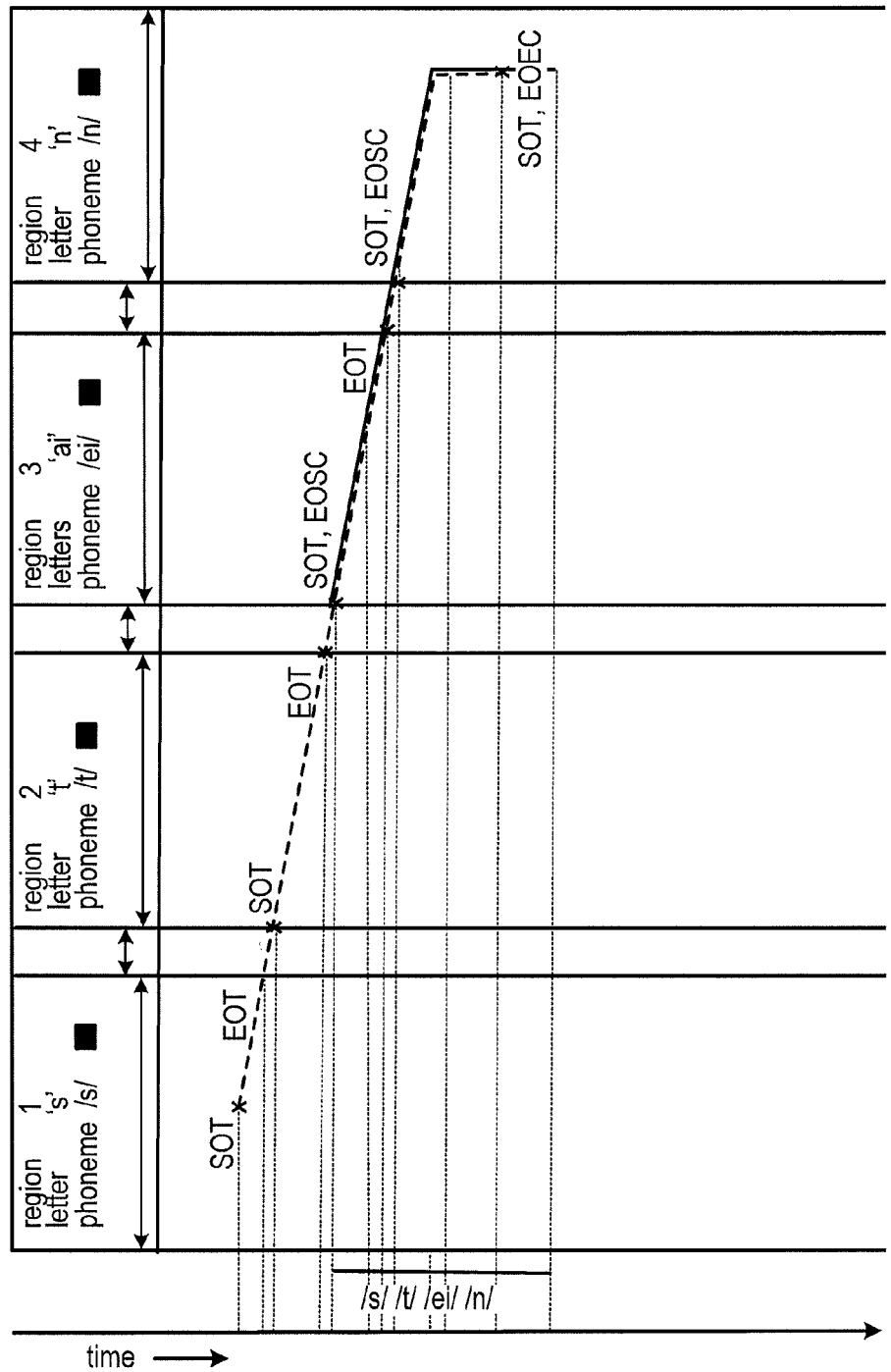

See FIG. 11, with Reference to FIG. 8 for Labeling Conventions.

In this example, a user slides the finger across the grapheme regions 1-4 in a rapid sequence w/o breaking contact with the touch-screen and briefly holding it on the last region.

Regions 1 and 2: No EOSC events occur (their traversal durations d=ct+bt do not exceed SC threshold values).

Region 3: The first EOSC event is triggered; it produces an acoustic segment /stei/ containing a consonant cluster and a sustained diphthong that persists until it is shortened and concatenated with the /n/ acoustic segment upon the EOSC event at region 4.

Region 4: Upon the EOEC occurrence, the sustained /n/ acoustic segment is shortened to match the duration of the traversal of region 4. After shortening, it is sustained past EOEC occurrence (due to deferred playback of the queued acoustic segments, in addition to the added transient sub-segment of the diphthong /ei/).

Figure 12:
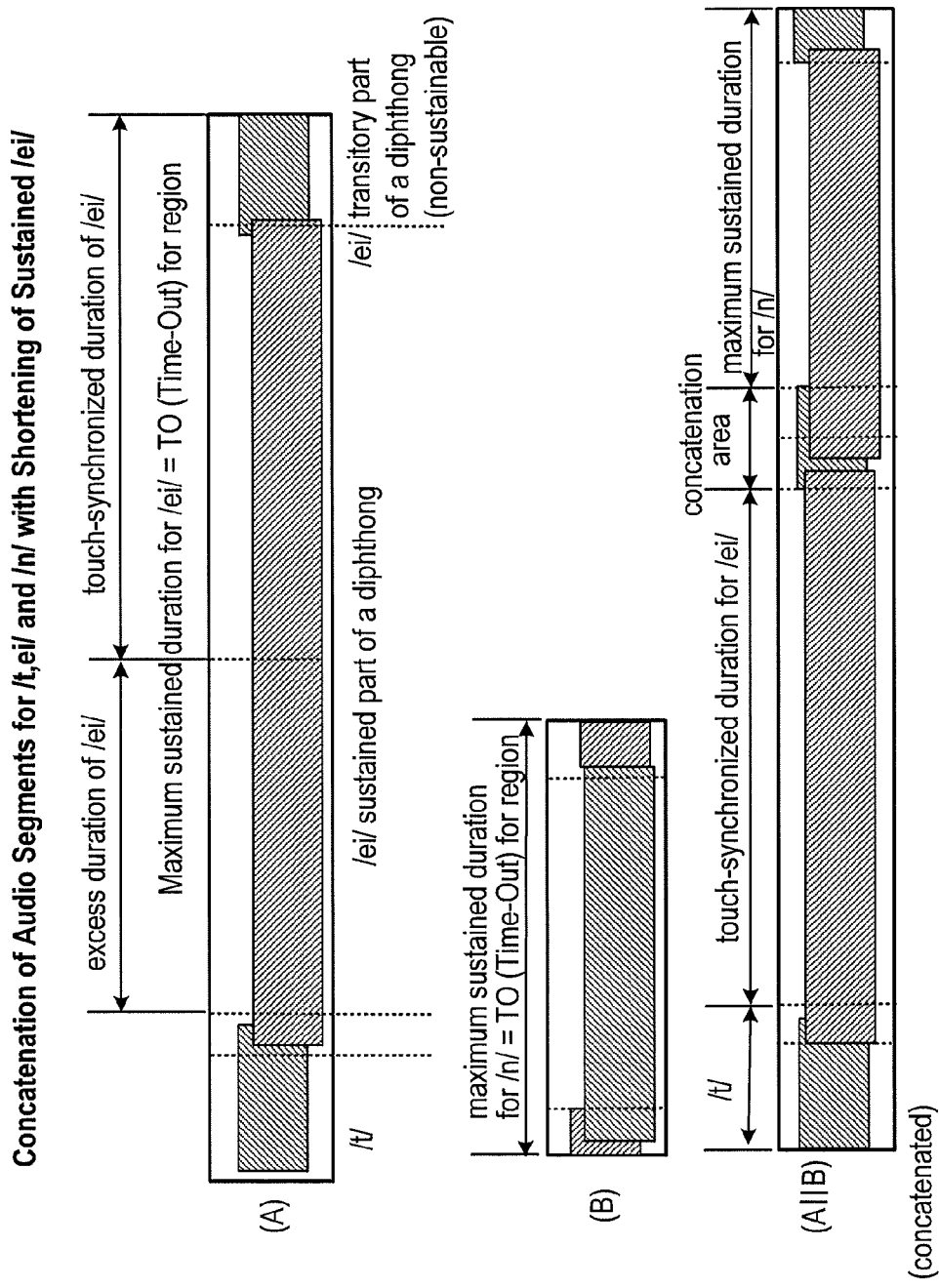

Another illustration of concatenation of acoustic segments with shortening of a sustained sub-segment is included in FIG. 12, in which an audio segment A is concatenated with another audio segment B, resulting in a segment A∥B. A contains a sustained diphthong sound of the maximum allowed duration (Time-Out duration) ending on a non-sustained (transitory) part of the diphthong. B contains a sustained nasal sound also of the maximum allowed duration. Based on the actual duration synchronized with the touch interval for the diphthong's grapheme region (that is shorter than the Time-Out duration), the excess of the diphthong sound's duration is removed, and the resulting shortened segment is concatenated with the segment B (left at its maximum sustained duration) producing A∥B.

In some implementations, the pronunciation of a letter or phoneme in a sequence of letters or phonemes to produce a word can vary based on a preceding letter or phoneme or a subsequent letter or phoneme.

Figure 13:
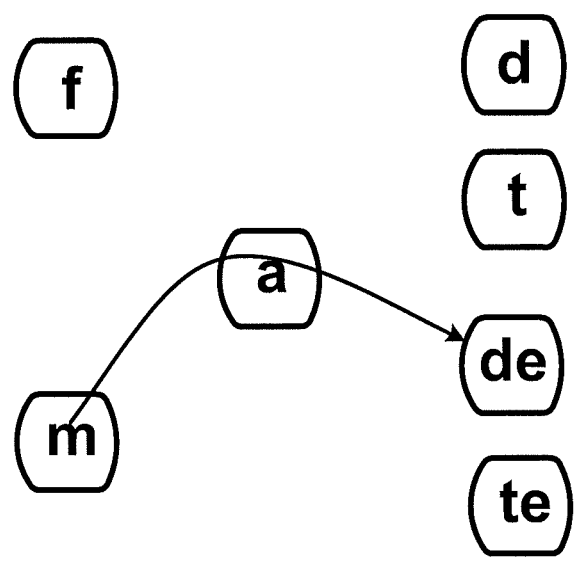
FIG. 13 is a partial screenshot showing a layout of grapheme-labeled regions on the touchscreen of the computer device in FIG. 1 and showing a path that a pointing device follows across the partial screenshot.

FIG. 13, for example, shows an exemplary layout of a plurality of grapheme-labeled regions that may be presented, for example, at the touchscreen 104 of a computer device 100.

In a typical implementation, in order for the computer device 100 to pronounce a word at the audio speaker 106, the user would move a pointing device (e.g., his or her finger) across the touchscreen 104, left-to-right, touching one grapheme-labeled region per column. In the illustrated layout, all of the left-to-write combinations of grapheme-labeled regions make acceptable words.

Notably, depending on the particular word being produced, the "a" sound in the middle column, for example, may be pronounced differently. For example, if the final grapheme-labeled region that is touched is "d," the "a" will make one sound, whereas if the final grapheme-labeled region that is touched is "de," the "a" will make a different sound (e.g., "mad" versus "made"). The illustrated trace shows a possible touch trajectory from "m" through "a" to "de" to pronounce "made".

In the illustrated layout, the "d" and "de" are apart from one another so that the trajectory of the user's finger moving from the "a" to one of these two destinations, which would cause the "a" to be pronounced differently, will be considerably different. This can facilitating predicting which of the two destinations will be touched next and help the computer device 100 quickly determine which of multiple possible pronunciations should be applied in a given set of circumstances.

Moreover, as a finger moves across the regions in FIG. 13 and reaches the "a" symbol, the sound cannot immediately be produced until there is some determination (or prediction) made as to what symbol (or grapheme or grapheme-labeled region) will be touched next. Yet, maintaining a continuity of sound is also generally desirable. This can help prevent the pronunciation from stopping so that the word sounds unnatural or even unintelligible.

Figure 14:
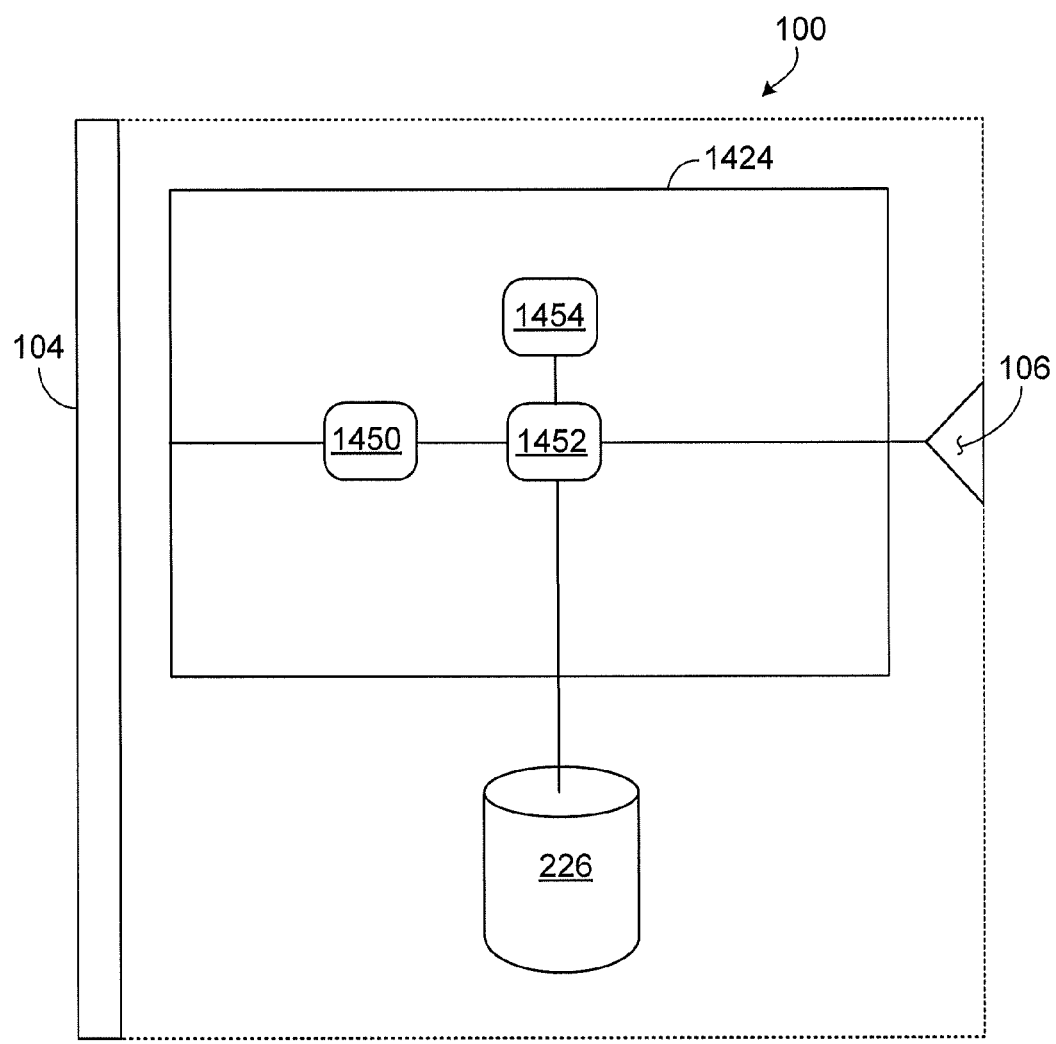
FIG. 14 is a partial schematic block diagram showing an implementation of the computer device of FIG. 1.

FIG. 14 is a partial schematic block diagram of a one implementation of the computer device 100 in FIG. 1.

According to the block diagram, the computer device 100 includes a processor 1424 and a memory storage device 226. In general, the memory storage device 226 stores the software with instructions to help implement various techniques disclosed herein and also stores other data that facilitates the implementation of those techniques, including, for example, pre-recorded or computer-generated audio versions of phonemes (or letter or combination of letters) that correspond to the grapheme-labeled regions presented on the touchscreen 104. In a typical implementation, if one or more of the phonemes (or letters or combination of letters) lend themselves to being pronounced or co-articulated in a number of different ways, then the memory storage device 226 can store one version of the phoneme (or letter or combination of letters) for each possible pronunciation or coarticulation.

In the illustrated implementation, the processor 224, which is coupled to the memory storage device 226, has a prediction module 1450, a phoneme selection module 1452 and a probability calculator 1454.

The prediction module 1450 is coupled to the touchscreen 104 and receives indications from the touchscreen whenever a pointing device (e.g., a user's finger) has contacted a grapheme-labeled region on the touchscreen 104. In general, the prediction module 1450 is adapted to predict, in response to an indication that a particular one of the labeled regions has been touched by a pointing device on the touchscreen, which of the other labeled regions on the computer-based touchscreen will be touched next by the pointing device.

In a typical implementation, the grapheme-labeled regions on the touchscreen 104 are arranged in two or more columns in such a manner that one of the labeled regions from each column can be touched by the pointing device in a sequence that causes the audio speaker to produce a word or a word portion.

Figure 17:
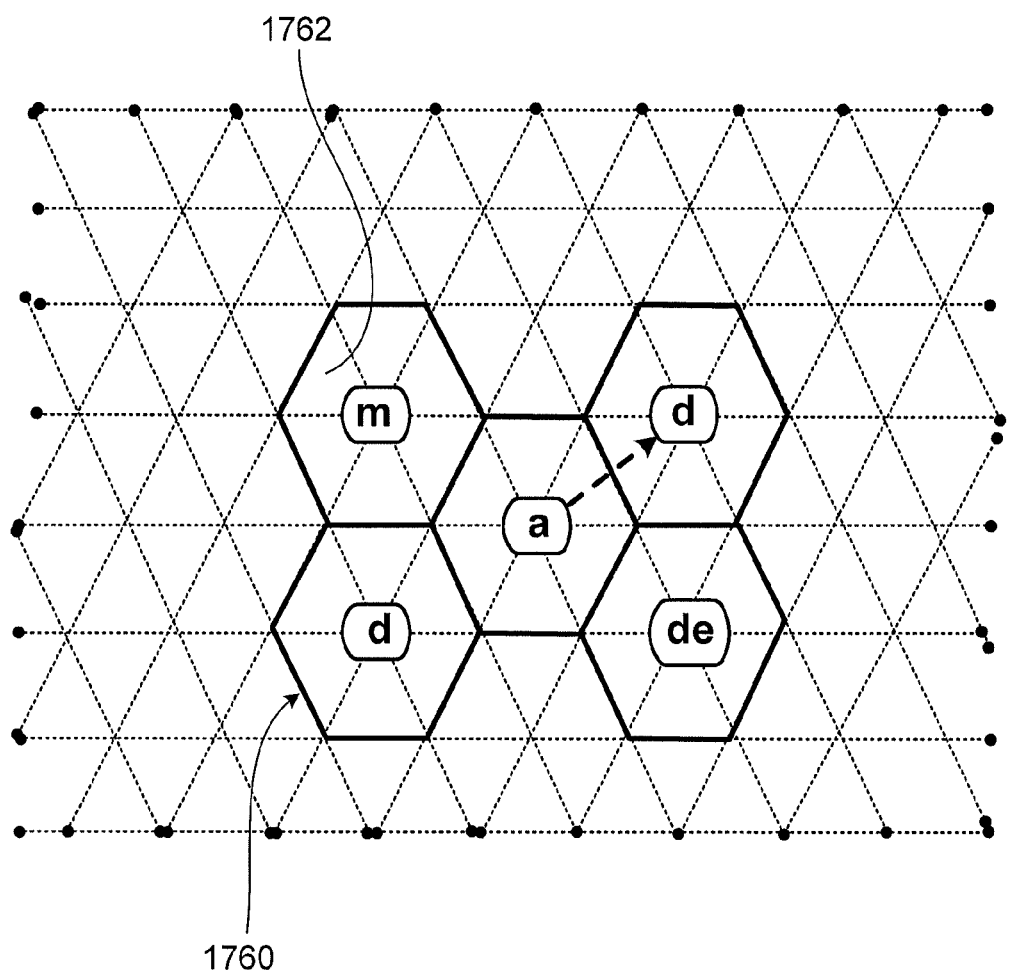
FIG. 17 shows an arrangement of grapheme-labeled regions with each region divided into sections.

Each region can be divided up into a multiple discrete physical sectors and the touchscreen could be adapted to provide an indication to the prediction module 1450 about which sector (or sectors) the pointing device is touching (or has touched). An example of this is shown in FIG. 17, in which each region has hexagonal border 1760. Adjacent hexagons have a pair of adjacent equilateral sectors along their common side. The borders of the hexagons may or may not be visible to the user. The inner, somewhat rectangular borders of the grapheme-labeled regions, however, typically are visible to the user.

In the illustrated example, each hexagon is divided up into six sectors 1762. In an implementation such as this, as the pointing device (e.g., a user's finger) moves within the grapheme region away from its center, it touches one or two of the six equilateral sectors. The dominant presence of the finger within one or two of the sectors can be used by the prediction module 1450 as a predictor of subsequent finger movement to one of the six adjacent hexagons. Once the touch stays within a hexagon for T seconds, where T can be a fraction, a prediction as to the next grapheme-labeled region to be touched is made and a sound appropriate in view of that prediction is made.

Therefore, the prediction module 1450 predicts which of the other grapheme-labeled regions on the computer-based touchscreen will be touched next by the pointing device by identifying a particular one of the grapheme-labeled regions that is physically proximate the physical sector that is in contact with the pointing device as the predicted next labeled region to be touched by the pointing device. In certain embodiments, the prediction module 1450 can confirm its prediction once the pointing device actually touches one of the physical sectors associated with the predicted next labeled region.

Typically, pairs of adjacent sounds (e.g., phonemes) are blended when they are forming a word. When a sound associated with a previous symbol cannot be stretched until the next sound is determined (e.g., it is a plosive), its start can be delayed to minimize any pronounced silence. If the situation is as in FIG. 13, where the layout makes it clear the next sound will be ambiguous, then the layout determines the delay in the first sound (which is not necessary in the case in FIG. 13). If there are so many symbols that the case is ambiguous, that is, there are at least two following symbols and one is ambiguous but the other isn't, the default case could be a delay; or the method could include waiting until the trajectory to the next symbol is established.

In some implementations, the prediction module 1450 predicts which of the other grapheme-labeled regions on the computer-based touchscreen will be touched next by the pointing device by identifying a plurality of fields that extend from the labeled region being touched by the pointing device to one or more of the other grapheme-labeled regions that could be touched by the pointing device next and identifying which, if any, of the plurality of fields the pointing device is touching after the pointing device moves outside of the touched grapheme-labeled region. In such implementations, the prediction module 1450 may designate the grapheme-labeled region associated with the identified field as the predicted next grapheme-labeled region to be touched by the pointing device.

Figure 15:
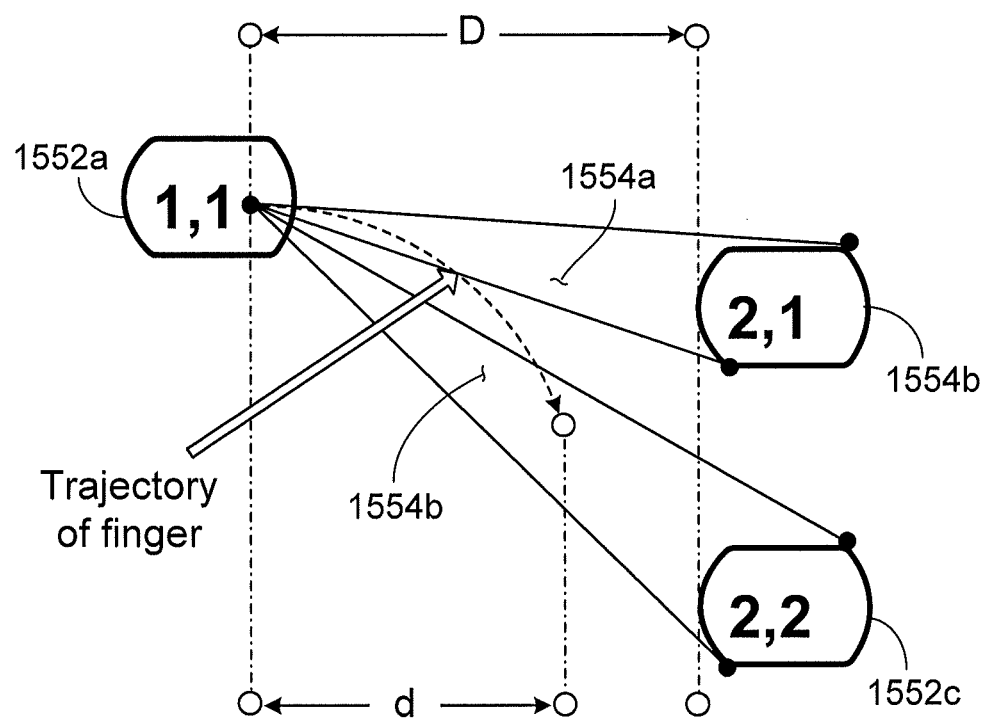
FIG. 15 shows a layout of grapheme-labeled regions on the touchscreen of the computer device in FIG. 1 and virtual fields that extend between the regions.

An example of this is shown in FIG. 15, which shows three regions 1552*a*, 1552*b*, 1552*c*, each of which may be a grapheme-labeled region. In the illustrated example, a user has touched a first one of the grapheme-labeled regions 1552*a* and moved his or her finger along the indicated trajectory generally toward the other grapheme-labeled regions 1552*b*, 1552*c*. Two fields 1554*a*, 1554*b*, which in a typical implementation are virtual (i.e., not visible on the touchscreen), extend from the first (or originating) grapheme-labeled region 1552*a* toward the respective possible destination regions 1552*b*, 1552*c*. Each field 1554*a*, 1554*b* has edges that flare out from approximately center point of its originating region 1552*a* to the outer edges of each respective possible destination region 1554*b*, 1554*c*.

In some implementations, the prediction module 1450 predicts which of the possible destination regions 1552*b*, 1552*c* will be touched next based, at least in part, on which, if any, of the plurality of fields the pointing device is touching at one or more points after the pointing device moves outside of the originating region 1554*a*. In such implementations, the prediction module 1450 may designate the grapheme-labeled region associated with the identified field as the predicted next grapheme-labeled region to be touched by the pointing device.

So, in the illustrated example, the prediction module 1450 may designate region 1554*c* as the predicted next region to be touched because (as indicated by the end of the finger's trajectory, the finger is touching the field that corresponds to region 1554*c*. In this instance, the computer device 100 will pronounce the phoneme that corresponds to the originating email in a manner that is appropriate in view of an expected subsequent phoneme that corresponds to the predicted destination region 1554*c*.

In some implementations, the touchscreen may present a pair (or more) of adjacent grapheme-labeled regions in a single column that include graphemes whose selection would not change the pronunciation of a previously-pronounced phoneme. In those instances, the prediction module 1450 may treat the pair (or more) of adjacent grapheme-labeled regions as a single region and identify a single field that extends from one of the labeled regions to the pair of adjacent labeled regions.

Referring again to FIG. 14, the selection module 1452 is coupled to the prediction module 1450 and is adapted to select, based on information it receives from the prediction module, among multiple database entries in the memory storage device 226 one of the different ways to pronounce the letter or combination of letters that appears on the touched grapheme-labeled region. The selection module 1452 performs this function based the prediction by the prediction module 1450 as to which of the other labeled regions on the computer-based touchscreen will be touched next.

The probability calculator 1454 is coupled to the selection module 1452 and is adapted to calculate a probability that the predicted next labeled region to be touched by the pointing device is correct. There are a number of ways that the probability calculator can perform this function.

For example, referring again to FIG. 15, the regions are numbered "column, row" to preserve generality, that is, (2,1) is the symbol/region in the second column, first row.

As a user moves his or her finger from the originating region toward a destination letter in the adjacent column, the trajectory, as shown in FIG. 15, is at some distance from the center point of the originating region in some direction, despite not having necessarily travelled in a straight line. The horizontal displacement from the center of the originating region to the finger location is d (as shown). In the figure, a touch at the center of the originating region would have to travel the distance d=D horizontally to reach the boundary of the terminating region.

In a typical implementation, the probability calculator 1454 can estimate the probability of the trajectory target, having started at i,j, being k,l, with a normal (i.e., Gaussian) distribution about respective imaginary lines that extend from the center of the originating region 1554*a* to each possible destination region 1554*b*, 1554*c* with a mean of $(a_{ijkl}+b_{ijkl})/2$, where $a_{ijkl}$ is an angle (relative to a fixed line) of a line that extends from the center of the originating region i,j to the top of the terminating region k,l and where $b_{ijkl}$ is an angle (relative to a fixed line) of a line that extends from the center of the originating region i,j to the bottom of the terminating region k,l. The standard deviation is $(a_{ijkl}-b_{ijkl})/2$.

Based on the foregoing and a known position for the pointing device on the touchscreen 104, the probability calculator 1454 can determine a probability $P_{ijkl}(x)$ that a predicted destination region is correct. The probability in this instance, given a particular horizontal displacement d, will be at its maximum when the finger is positioned in the center of the target region.

It is noted that as the user's finger moves closer to one of the possible destination regions, the likelihood that a prediction made using the above-referenced Gaussian distribution technique is correct increases. Thus, in some implementations, the probability module may weigh the calculated probability so that the probability increases in a linear fashion as the user's finger moves closer to the destination region. In such instances, the probability module may calculate the probability (S) as follows: $S=P_{ijkl}(x)d/D$, wherein D is the horizontal distance between the originating region and the destination region and d is the horizontal distance that the user's finger has traveled at any given time as it traverses the touchscreen. This can be computed for each target region.

In certain embodiments, the probability module defines a threshold value $S_T(k,l)$, the computer device 100 can respond by producing a corresponding phoneme at the audio speaker. In different embodiments, different threshold values may be deemed appropriate. Typically, the audio speaker begins pronouncing the letter or combination of letters associated with the labeled region that has been touched before the pointing device touches the next one of the grapheme-labeled regions.

In some implementations, the grapheme-labeled regions on the touchscreen can be arranged to facilitate predicting the next labeled region to be touched by the pointing device. For example, if the third column of grapheme-labeled regions includes two grapheme-labeled regions that, if touched, would cause a previous phoneme to have a first pronunciation and includes one grapheme-labeled region that, if touched, would cause the previous phoneme to have a second pronunciation different than the first, then the three grapheme-labeled regions could be arranged so that the two grapheme-labeled regions that cause the first pronunciation are at a higher point on the touchscreen than the grapheme-labeled region of the previous phoneme and the one grapheme-labeled region that causes the second phoneme is at a lower point on the touchscreen than the grapheme-labeled region of the previous phoneme.

In that situation, the arrangement of grapheme-labeled regions on the touchscreen facilitates predicting the next touched grapheme-labeled region, because the user's finger would go in one direction (in a somewhat upward direction) toward the two grapheme-labeled regions that cause the first pronunciation and would go in a completely different direction (in a somewhat downward direction) toward the one grapheme-labeled region that causes the second pronunciation.

Other techniques may be implemented to facilitate predicting a next touched grapheme-labeled region as well.

In some instances, at least some of the letters or combinations of letters (or graphemes) on the plurality of labeled regions may be pronounced differently to produce a word or word portion depending on which of the other labeled regions was touched by the pointing device previously. The computer device is adapted to handle this as well. More particularly, the computer device is adapted so that, where appropriate, the audio speaker pronounces the letter or letters that corresponds to the particular one of the labeled regions based on the previously-touched grapheme-labeled region.

Figure 16:
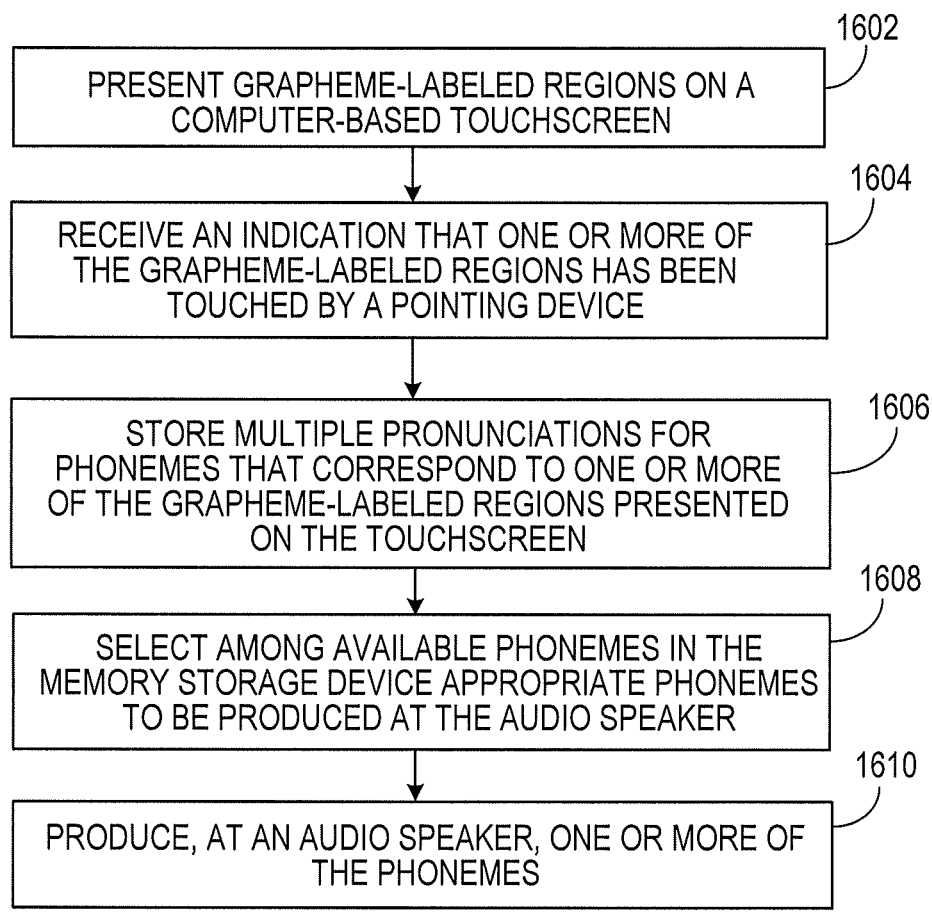
FIG. 16 is a flowchart showing one implementation of a method for producing a phoneme at an audio speaker in the computer device of FIG. 15.

FIG. 16 is a flowchart showing one implementation of a computer-based method for predicting a subsequently touched grapheme-labeled region among several possible grapheme-labeled regions.

The illustrated computer-based method can be implemented, for example, on the computer device 100 shown in FIG. 1 and FIG. 14.

According to the illustrated implementation, the computer device 100 presents (at 1602) a plurality of grapheme-labeled regions, where each grapheme-labeled region includes a letter or combination of letters, on a computer-based touchscreen 104. An example of the layout of grapheme-labeled regions that may be presented is shown in FIG. 13.

According to the method of FIG. 16, the computer device 100 receives an indication (at 1604) that one or more of the grapheme-labeled regions has been touched by a pointing device moving across the touchscreen. For example, the computer device 100 may receive an indication that the "a" in the central column of FIG. 13 has been touched.

The computer device 100 (i.e., the prediction module 1450) then predicts (at 1406), typically as quickly as possible, which of the other labeled regions on the computer-based touchscreen will be touched next by the pointing device. Considering the layout shown in FIG. 13 and assuming that the user's finger needs to travel left to right on the touchscreen in order for the next touched grapheme-labeled region to be considered part of the word being produced (an optional requirement), then the possible options for determining the next touched grapheme-labeled regions would include "d," "t," "de," and "te."

The illustrated method (at 1606) includes storing multiple pronunciations for phonemes that correspond to one or more of the grapheme-labeled regions presented on the touchscreen. The memory storage device 226 in FIG. 14, for example, can store multiple database entries that respectively represent these different pronunciations. For example, for the grapheme-labeled region "a" in FIG. 13, the memory storage device 226 can store one pronunciation for "a" if the word being pronounced were "mad" and another pronunciation for "a" if the word being pronounced were "made." The memory storage device can store other pronunciations as well.

The illustrated method (at 1608) further includes selecting among available phonemes (and versions of phonemes having different pronunciations) in the memory storage device an appropriate one of the phonemes to be produced at the audio speaker. In a typical implementation, the selection is made in view of the prediction as to which of the other labeled regions on the computer-based touchscreen will be touched next.

For example, if the computer device 100 is trying to decide how the "a" in the middle column of FIG. 13 should be pronounced, and the prediction module 1450 has predicted that the "de" region will be the next grapheme-labeled region to be touched, then the phoneme selection module 1452 would select the "a" sound that would be pronounced in "made."

The illustrated method (at 1610) also includes producing, at an audio speaker (e.g., audio speaker 106), a pronunciation of the letter or combination of letters on the grapheme-labeled region that has been touched based on the selected database entry. The pronunciation typically is done with appropriate coarticulation as well.

The audio speaker 106 typically begins producing the pronunciation as soon as possible and typically before the pointing device actually touches the next one of the grapheme-labeled regions.

In a typical implementation, at least some of the letters or combinations of letters on the grapheme-labeled regions may be pronounced differently to produce a word or word portion depending on which of the other grapheme-labeled regions was touched by the pointing device previously. In those instances, the computer device can select an appropriate pronunciation of one or more of the letters or phonemes in view of the previously-touched grapheme-labeled region.

Thus, in various implementations, one or more of the following may exist:

1. The layout and words chosen are carefully designed so that the direction of movement between two letters where this difficulty exists is as different as possible. FIG. 13 illustrates an example of such placement. If the "d" and "de" were both above the "a," the difference in trajectories leaving the "a" would be more difficult to assess.
2. Predicting the next symbol/tile to be touched by noting the direction of the touch leaving the symbol/tile/grapheme/grapheme-labeled region or noting a change of direction that indicates the intended direction of movement, such that the direction is sufficiently indicative of the next symbol, and beginning to pronounce the sound of the current symbol given that context.
3. The previous phoneme can be stretched if it admits of stretching until the estimate of the direction of the touch trajectory leaving the symbol is sufficiently certain.
4. If the direction is changed after supposedly determined to go to a letter that would change a pronunciation already started, this case must have special handling, e.g.:
   An error sound or instruction to please repeat the movement.
   Pronouncing the entire word over with the correct pronunciation.

In some implementations, one or more of these concepts can help produce a system (or device) in which a child will point his finger to the first letter (grapheme/symbol) of a word and then slide his finger to the subsequent letters and proper and the computer system (or device) will produce a relatively quick, correct and fluent pronunciation of the traced word.

Figure 18:
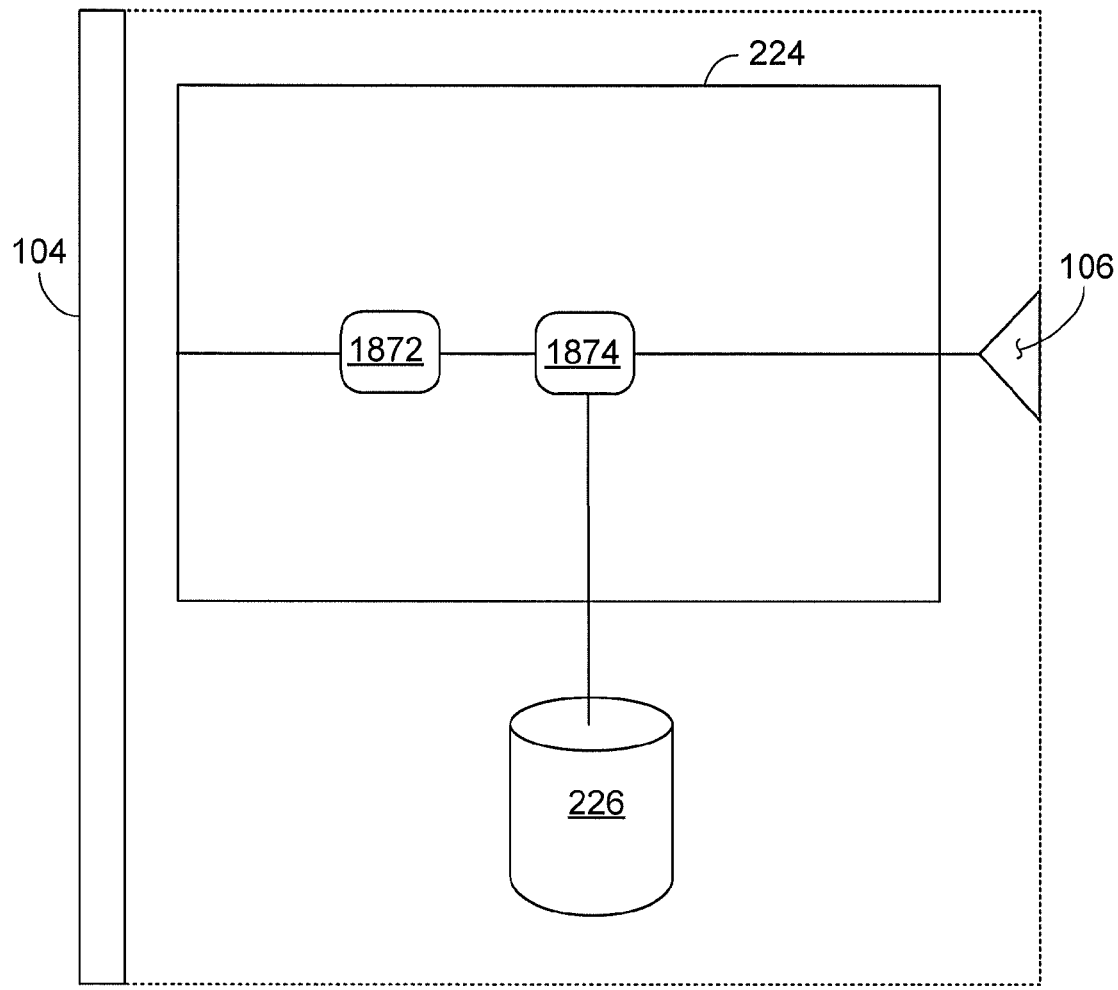
FIG. 18 is a partial schematic block diagram showing an implementation of the computer device of FIG. 1.

FIG. 18 is a schematic block diagram showing an implementation of the computer device 100 of FIG. 1.

The illustrated implementation includes the computer-based touchscreen 104 adapted to present a plurality of grapheme-labeled regions, the audio speaker 106 to produce one or more phonemes that correspond to one or more of the grapheme-labeled regions touched by a pointing device, a coarticulation module 1872 and a phoneme selection module 1874.

The coarticulation module 1872 is adapted to coarticulate a particular one or more of the phonemes produced at the audio speaker 106 based on at least one other phoneme produced at the audio speaker immediately before or immediately after the phoneme being articulated.

Coarticulation, in general, refers to how a conceptually isolated speech sound is influenced by, and becomes more like, a preceding or following speech sound. There are generally two types of coarticulation: anticipatory coarticulation, when a feature or characteristic of a speech sound is anticipated (assumed) during the production of a preceding speech sound; and carryover or preservative coarticulation, when the effects of a sound are seen during the production of sound(s) that follow.

There are many models that can be used by the coarticulation module 1872 to determine appropriate coarticulation for a given phoneme. These include, for example, the look-ahead, articulatory syllable, time-locked, window, coproduction and articulatory phonology models.

In some implementations, the coarticulation module 1872 determines proper coarticulation for a particular one of the phonemes based on the phoneme produced at the audio speaker immediately before the particular one of the phonemes. In some implementations, the coarticulation module 1872 determines proper coarticulation for a particular one of the phonemes based on the phoneme produced at the audio speaker immediately after the particular one of the phonemes. In some implementations, the coarticulation module 1872 determines proper coarticulation for a particular one of the phonemes based on the phoneme produced at the audio speaker immediately before the particular one of the phonemes and based on the phoneme produced at the audio speaker immediately after the particular one of the phonemes.

In a typical implementation, the memory storage device 226 stores different versions of each phoneme that lends itself to being coarticulated in different ways—one version for each way that the phoneme can be coarticulated.

The phoneme selection module 1874 is adapted to select an appropriately coarticulated version of a phoneme from the multiple versions of the phoneme in memory storage device 226 in view of the determination made by the coarticulation module 1872.

Figure 19:
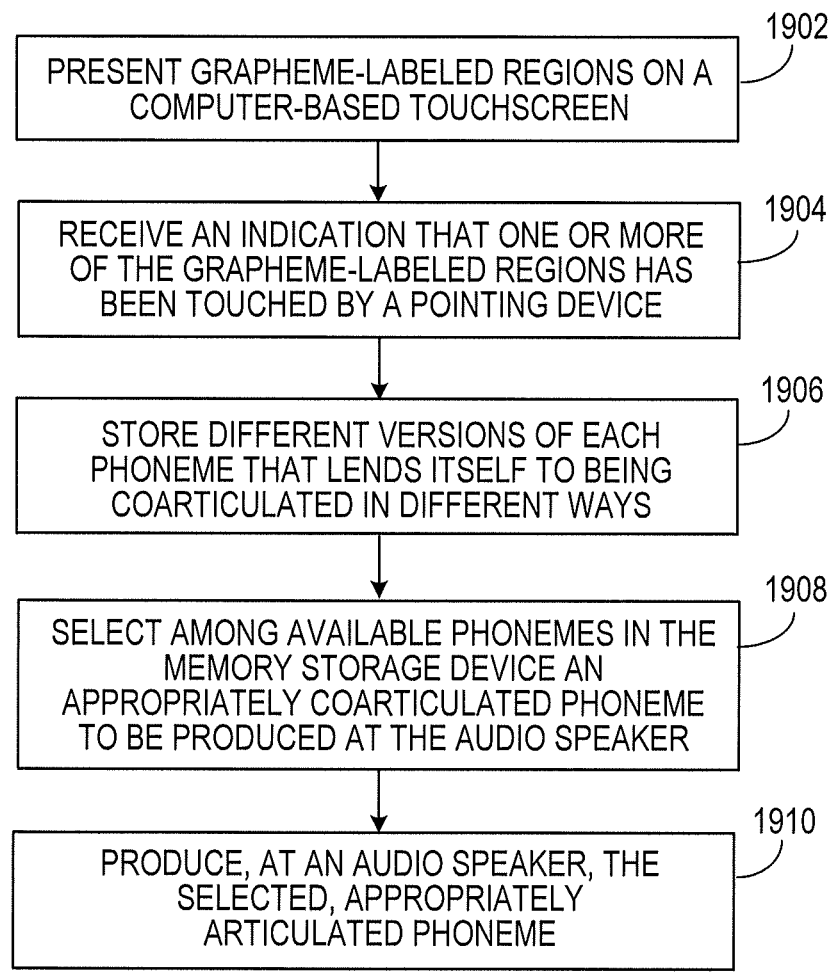
FIG. 19 is a flowchart showing one implementation of a method for producing a phoneme at an audio speaker in the computer device of FIG. 18.

FIG. 19 is a flowchart of a computer-based method of producing sound in response to touch and including appropriate coarticulation. The illustrated method can be implemented, for example, by the computer device 100 in FIG. 1 and FIG. 18.

According to the illustrated method, the computer device 100 presents (at 1902) a plurality of grapheme-labeled regions on the computer-based touchscreen 104.

The computer device 100 then receives (at 1904) an indication that one or more of the grapheme-labeled regions has been touched by a pointing device moving across the touchscreen.

According to the illustrated method, the memory storage device 226 stores (at 1906) different versions of each phoneme that lends itself to being coarticulated in different ways—typically, one version for each way that the phoneme can be coarticulated.

The phoneme selection module 1874 then selects (at 1908) an appropriately coarticulated phoneme to be produced at the audio speaker.

The illustrated method further includes (at 1910) producing, at an audio speaker, the selected phoneme, typically in association with one or more other phonemes to produce a word or word portion.

A number of embodiments of the invention have been described. Nevertheless, it will be understood that various modifications may be made without departing from the spirit and scope of the invention.

For example, some implementations will include combinations of the various elements disclosed in connection with the various aspects disclosed herein. For example, in some implementations, a processor may include one or more of the functional components disclosed in connection with FIG. 2, one or more of the functional components disclosed in connection with FIG. 14 and/or one or more of the functional components disclosed in connection with FIG. 18.

Similarly, a device or system may be adapted to perform one or more of the functions disclosed in connection with FIG. 3, one or more of the functions disclosed in connection with FIG. 16 and one or more of the functions disclosed in connection with FIG. 19.

The computer device 100 can be a smartphones, PDS, video game platform, or the like. The pointing device can be a computer mouse, a stylus or the like. The various functional components can be interconnected in a variety of ways and, in some instances, some of the functional components can be eliminated entirely. The computer storage medium that stores instructions for implementing one or more of the processes disclosed herein can be non-transitory in nature.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus ("processor") on data stored on one or more computer-readable storage devices or received from other sources.

The terms "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

The methodology described can be adapted to various game platforms or user interface designs as they evolve. For example, the Kinect game system from Microsoft detects motion at a distance by analyzing camera images. The pointing device could thus be the user waving a hand to control a pointer visible on a TV screen attached to the game system or even the motion of their full body moving. The software could be loaded into the game machine as it is loaded into other computer systems; games for such devices are typically loaded from many possible sources, including physical devices such as a memory stick or non-physical means such as downloading from the Internet.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-based method comprising:
    presenting a plurality of grapheme-labeled regions on a computer-based touchscreen;
    receiving an indication that one or more of the grapheme-labeled regions has been touched by a pointing device;
    measuring an amount of time that the pointing device maintains contact with each one of the one or more grapheme-labeled regions that has been touched by the pointing device;
    producing, at an audio speaker, one or more phonemes, each phoneme based on a grapheme that appears on one of the respective grapheme-labeled regions that has been touched by the pointing device, wherein each grapheme presented represents a single phoneme; and setting an audible duration for a particular one of the phonemes produced at the audio speaker based on a measured amount of time that the pointing device maintains contact with a particular one of the grapheme-labeled regions.

2. The computer-based method of claim 1 wherein the audible duration associated with the particular one of the phonemes, if the particular one of the phonemes is sustainable, is directly proportional, up to a set maximum duration, to the measured amount of time that the pointing device maintains contact with the particular one of the grapheme-labeled regions.

3. The computer-based method of claim 1 wherein the particular one of the phonemes whose audible duration is set corresponds to a grapheme that appears on the particular one of the grapheme-labeled regions.

4. The computer-based method of claim 1 wherein the particular one of the phonemes whose audible duration is set corresponds to a grapheme that appears on another one of the grapheme-labeled regions other than the particular one of the grapheme-labeled regions.

5. The computer-based method of claim 1 further comprising:
in response to the pointing device touching a grapheme-labeled region that corresponds to a phoneme with a pronunciation that is not sustainable:
introducing a delay before producing the phoneme associated with the touched grapheme-labeled region, if pronunciation of the phoneme corresponding to the grapheme-labeled region cannot be extended; and
extending pronunciation of a preceding phoneme, if the preceding pronunciation can be extended.

6. The computer-based method of claim 4 further comprising:
in response to the pointing device touching a grapheme-labeled region that corresponds to a phoneme with a pronunciation that is not sustainable:
introducing a delay before producing the phoneme associated with the touched grapheme-labeled region, if pronunciation of the phoneme corresponding to the grapheme-labeled region cannot be extended; and
initiating pronunciation of a subsequent phoneme without delay.

7. The computer-based method of claim 1 wherein producing the one or more phonemes comprises:
producing a sequence of phonemes at the audio speaker in response to the pointing device contacting a sequence of grapheme-labeled regions,
wherein each of the phonemes in the sequence corresponds to one of the graphemes that appears on a respective one of the grapheme-labeled regions; and
wherein the sequence of phonemes produced at the audio speaker forms a word or a portion of a word corresponding to the sequence of grapheme-labeled regions.

8. The computer-based method of claim 1 further comprising setting an onset time for one or more of the phonemes based on a measured amount of time.

9. The computer-based method of claim 7 further comprising:
concatenating the phonemes in the sequence so that the word or the portion of the word produced at the audio speaker is substantially continuous and pronounced to sound like the word or portion of the word without unnatural pauses.

10. The computer-based method of claim 1 further comprising:
calculating a speed of the pointing device across one or more of the grapheme-labeled regions or one or more portions of the one or more grapheme-labeled regions,
wherein setting the audible duration for the particular one of the phonemes comprises setting the audible duration based on the calculated speed.

11. The computer-based method of claim 10 wherein setting the duration for the particular one of the phonemes produced at the audio speaker comprises:
setting an extended duration based on the calculated speed of the pointing device if the particular one of the phonemes is sustainable.

12. A computer system comprising:
a computer-based touchscreen to present a plurality of grapheme-labeled regions;
a timing module to measure an amount of time that a pointing device maintains contact with each of the one or more grapheme-labeled regions;
an audio speaker to produce one or more phonemes, each phoneme based on an associated one of the grapheme-labeled regions such that each grapheme touched by the pointing device represents a single phoneme; and
a phoneme setting module to set an audible duration for a particular one of the phonemes produced at the audio speaker based on the measured amount of time that the pointing device maintains contact with a particular one of the grapheme-labeled regions.

13. The computer system of claim 12 wherein the audible duration for the particular one of the phonemes produced at the audio speaker is directly proportional to the amount of time measured by the timing module, up to a set maximum duration, if the particular one of the phonemes is sustainable.

14. The computer system of claim 12 wherein the particular one of the phonemes whose audible duration is set corresponds to a grapheme that appears on the particular one of the grapheme-labeled regions if the particular one of the phonemes is sustainable.

15. The computer system of claim 12 wherein the particular one of the phonemes whose audible duration is set corresponds to a grapheme that appears on one of the grapheme-labeled regions other than the particular one of the grapheme-labeled regions if the particular one of the phonemes is not sustainable.

16. The computer system of claim 12 wherein the audio speaker produces a sequence of phonemes in response to the pointing device contacting a sequence of the grapheme-labeled regions,
wherein each phoneme in the sequence corresponds to a respective grapheme that appears on one of the grapheme-labeled regions, and
wherein the sequence of phonemes produced at the audio speaker forms a word or a portion of a word corresponding to the sequence of graphemes.

17. The computer system of claim 12 wherein the phoneme setting module sets an onset time for one or more of the phonemes based on the measured amount of time.

18. The computer system of claim 17 further comprising:
a concatenation module to concatenate the phonemes in a sequence so that the word or the portion of the word produced at the audio speaker is substantially continuous and pronounced to sound like the word or the portion of the word without unnatural pauses.

19. The computer system of claim 12 further comprising:
a speed calculator to calculate a speed with which the pointing device moves across one or more of the grapheme-labeled regions or one or more portions of the one or more grapheme-labeled regions, wherein the audible duration of one or more of the phonemes produced at the audio speaker in response to the one or more grapheme-labeled regions being touched is related to the calculated speed.

20. The computer system of claim 19 wherein the phoneme duration setting module sets an extended duration for a particular one of the one or more phonemes based on the calculated speed of the pointing device if the particular one of the phonemes is sustainable.

21. The computer system of claim 16 wherein the particular one of the phonemes whose audible duration is set corresponds to a grapheme that appears on one of the grapheme-labeled regions other than the particular one of the grapheme-labeled regions if the particular one of the phonemes is not sustainable.

22. A non-transitory computer-readable medium that stores instructions executable by one or more processors to perform a method comprising:

presenting a plurality of grapheme-labeled regions on a computer-based touchscreen;

receiving an indication that one or more of the grapheme-labeled regions has been touched by a pointing device;

measuring an amount of time that the pointing device maintains contact with each one of the one or more grapheme-labeled regions that has been touched by the pointing device; and producing, at an audio speaker, one or more phonemes, each phoneme based on a grapheme that appears on one of the respective grapheme-labeled regions that has been touched by the pointing device, wherein each grapheme represents a single phoneme; and setting an audible duration for a particular one of the phonemes produced at the audio speaker based on a measured amount of time that the pointing device maintains contact with a particular one of the grapheme-labeled regions.

23. The computer-based method of claim 22 further comprising:

measuring an amount of time that the pointing device maintains contact with each one of the one or more grapheme-labeled regions that has been touched by the pointing device; and setting an audible duration for a certain one of the phonemes produced at the audio speaker based on the measured amount of time that the pointing device maintains contact with one of the grapheme-labeled regions.

* * * * *